United States Patent [19]

Weston

[11] 4,277,446

[45] Jul. 7, 1981

[54] REMOVAL OF IRON AND TITANIUM MINERALS FROM ALUMINUM BEARING MATERIALS BY CHLORINATION AND BENEFICIATION

[75] Inventor: David Weston, Toronto, Canada

[73] Assignee: Reynolds Metals Company, Richmond, Va.

[21] Appl. No.: 115,397

[22] Filed: Jan. 25, 1980

Related U.S. Application Data

[63] Continuation-in-part of Ser. No. 6,111, Jan. 24, 1979, abandoned.

[51] Int. Cl.³ .......................... C01F 7/56; C01F 7/02
[52] U.S. Cl. ................................... 423/136; 423/133; 423/135; 423/76; 423/79; 423/80; 423/113; 423/343; 423/149
[58] Field of Search .................. 423/79, 80, 133, 135, 423/136, 76, 149, 113

[56] References Cited

U.S. PATENT DOCUMENTS

| 902,255 | 10/1908 | Saunders et al. | |
|---|---|---|---|
| 1,858,272 | 5/1932 | Jenness | |
| 1,875,105 | 8/1932 | Muggleton et al. | |
| 1,982,194 | 11/1934 | Brodi et al. | |
| 2,030,868 | 2/1936 | Hart | |
| 3,466,169 | 9/1969 | Nowak et al. | 75/112 |
| 3,489,514 | 1/1970 | Slatin | 423/135 |
| 3,793,003 | 2/1974 | Othmer | 423/136 |
| 3,856,508 | 12/1974 | Othmer | 423/136 |
| 4,096,234 | 6/1978 | Martin et al. | 423/135 |
| 4,159,310 | 6/1979 | Reynolds et al. | 423/135 |
| 4,183,899 | 1/1980 | Bonsack | 423/79 |
| 4,213,943 | 7/1980 | Martin | 423/135 |

FOREIGN PATENT DOCUMENTS

569830 2/1959 Canada .
1243165 of 1936 Fed. Rep. of Germany .
771411 4/1957 United Kingdom .

OTHER PUBLICATIONS

The Canadian Patent Office Record, Sep. 9, 1941, p. 2508, Abstract of Canadian Pat. No. 399,170.
Wallice et al., "UK Patent Application No. 2,020,643A," Nov. 21, 1979.
Landsberg, "Metallurgical Transactions B", vol. 6B, Jun. 1975, pp. 207-214.
Milne, "Proc. Australas. Inst. Min. Metall.," No. 260, Dec. 1976, pp. 23-31.
McAfee, "Ind. and Eng. Chem.," vol. 21, 1929, pp. 670-673.
Holliday et al., "Ind. Eng. Chem., Process Dev.," vol. 14, 1975, pp. 449-452.
Foley et al., "The Aus. IMM Conference, Western Australia," Aug. 1979, Removal of Iron from Bauxite.
Milne et al., "Ind. Eng. Chem., Process Dev.," vol. 14, 1975, pp. 442-447.
Beauchamp, "Bureau of Mines, IC8412," pp. 1-19.

*Primary Examiner*—Herbert T. Carter
*Attorney, Agent, or Firm*—Glenn, Lyne, Girard & McDonald

[57] ABSTRACT

A process for the removal of iron and titanium minerals from aluminum bearing materials in at least one chlorination stage by the use of an excess of aluminum trichloride as at least the major chlorinating agent for the contained iron and titanium minerals, condensing the excess aluminum trichloride to recover the aluminum trichloride in an impure form, and recycling the impure aluminum trichloride to the chlorination stage together with additional aluminum trichloride or starvation amounts of chlorine, or alternately additional amounts of aluminum trichloride and starvation amounts of chlorine.

27 Claims, 8 Drawing Figures

Fig. 1 — SIMPLEST FLOWSHEET OF THE INVENTION

Fig. 2 — Simplest flowsheet of the invention to obtain separation of the $Al_2O_3 \cdot SiO_2$ residual solids following the number one chlorination stage of the invention as shown in FIG 1

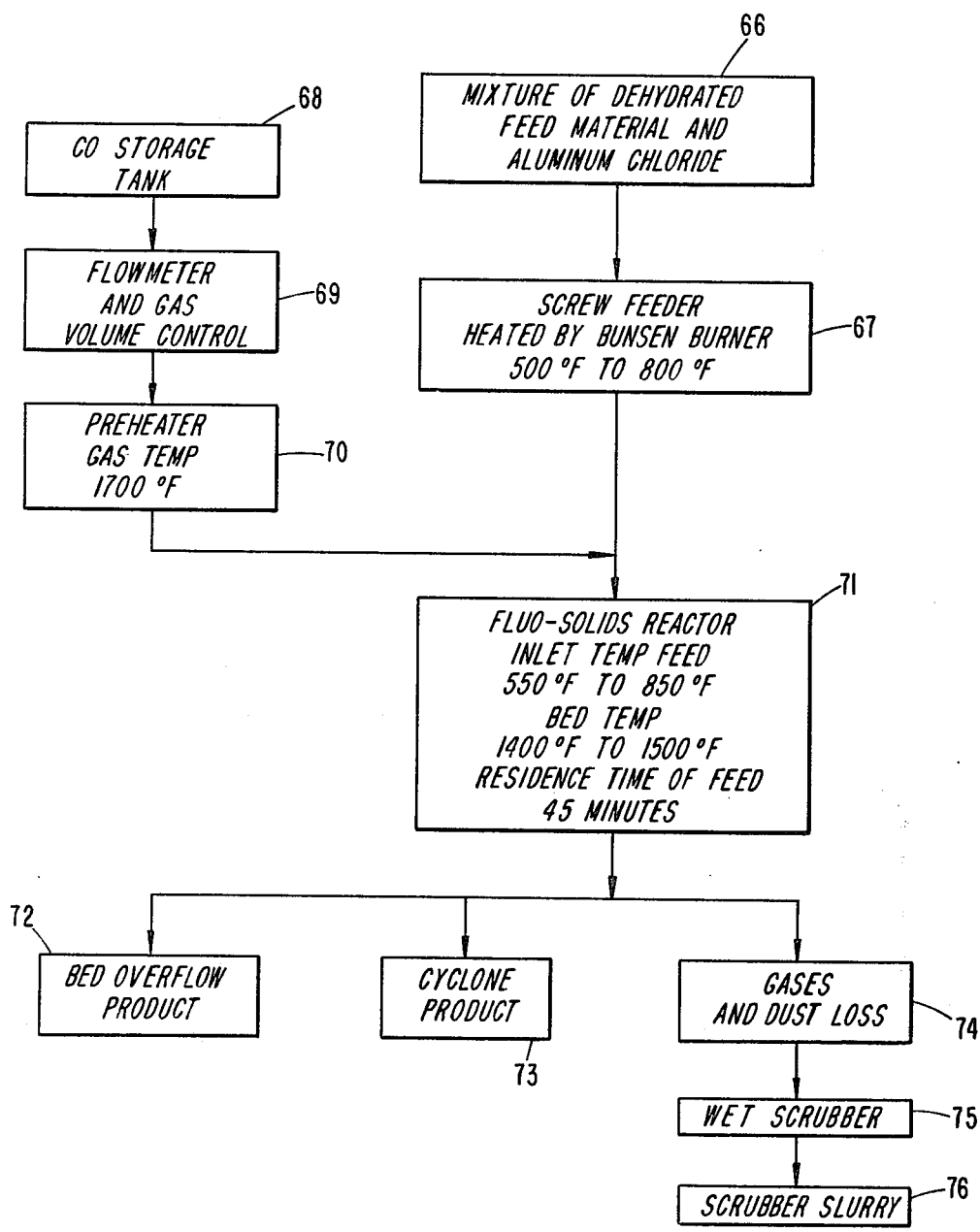

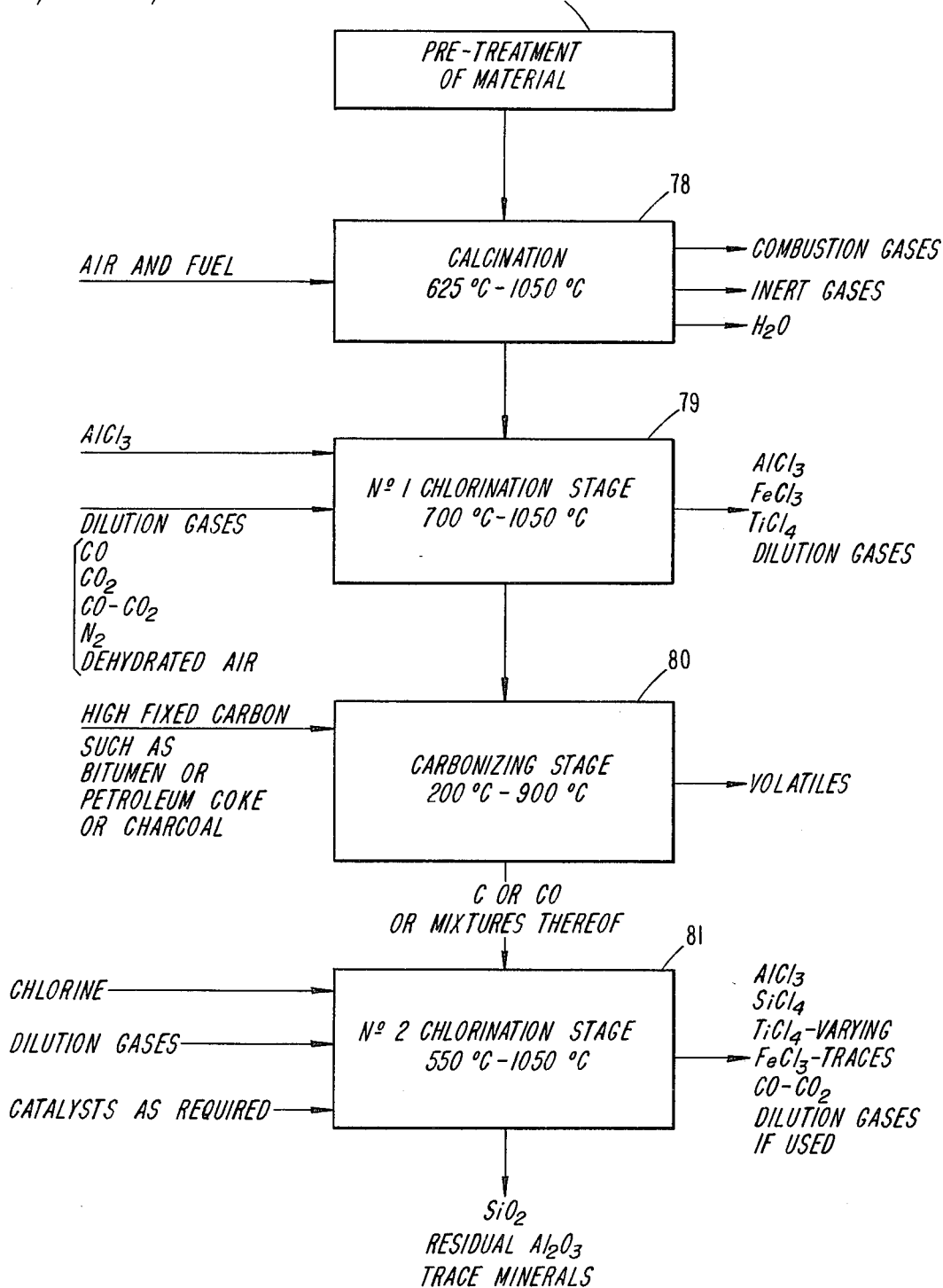

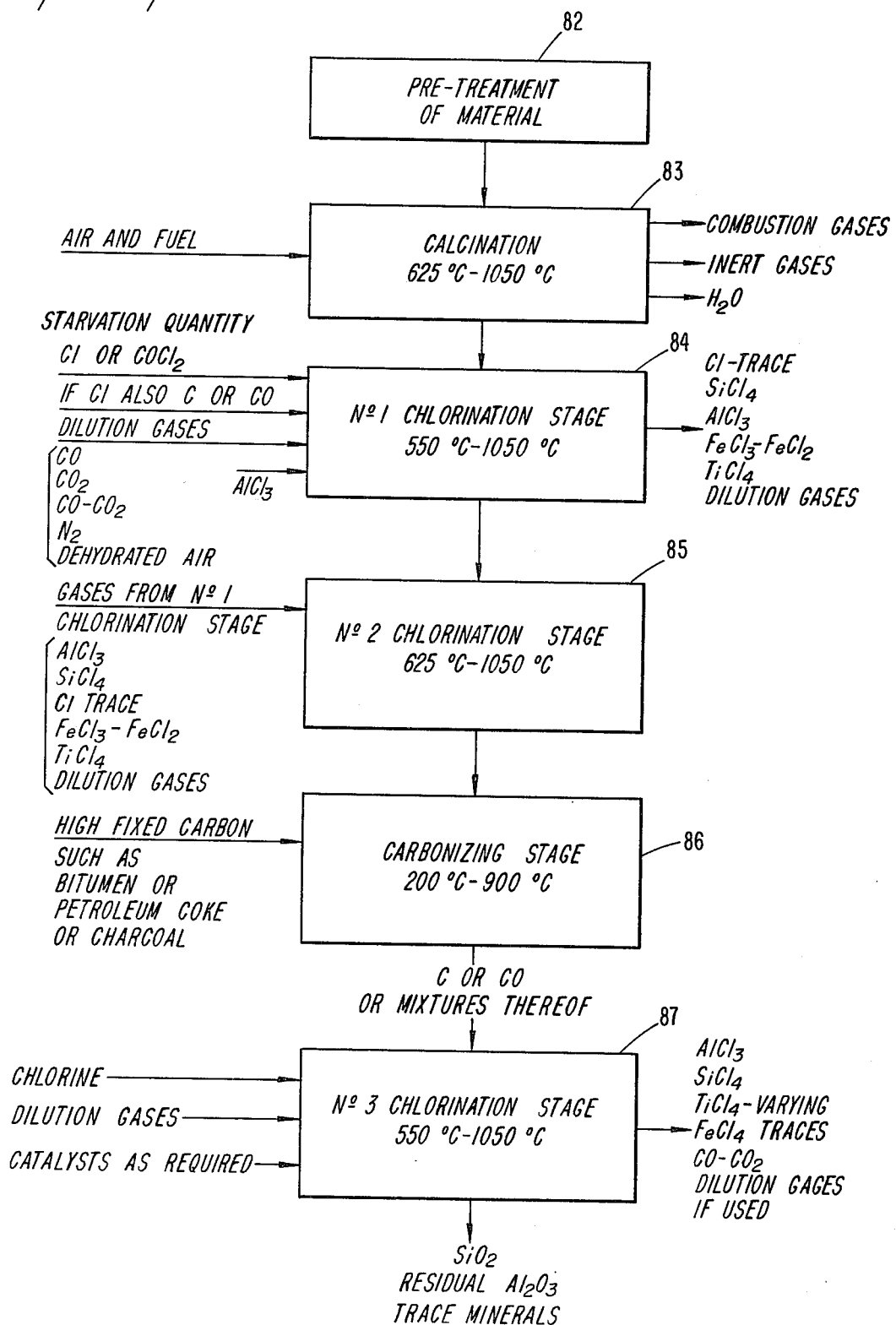

REMOVAL OF IRON AND TITANIUM MINERALS FROM ALUMINUM BEARING MATERIALS BY CHLORINATION AND BENEFICIATION

CROSS-REFERENCE TO RELATED APPLICATION

This is a continuation-in-part of application Ser. No. 006,111, filed Jan. 24, 1979 and now abandoned.

BACKGROUND OF THE INVENTION

This invention is primarily applicable to materials such as Bauxites, Bauxitic Clays, Aluminum Mineral bearing clays, and many other Aluminum containing materials that have present as an impurity at least iron, and in many cases iron and titanium in various mineral forms.

There has been a great deal of research and there is a vast quantity of literature in attempts to produce a relatively iron-free alumina and aluminum chloride from particularly raw materials such as Bauxites and Clays. None of the processes proposed have been shown to be economically successful.

This problem can best be described by the following references:

Landsberg "Chlorination Kinetics of Aluminum Bearing Minerals: Metallurigical Transactions B," Volume 6B, June 1975; pps. 207–208. To quote from page 208, 1st column:

"Whereas Foley and Tittle showed that iron could be removed from pre-reduced bauxite by chlorination to produce a refractory grade alumina, FIG. 2 indicates that a substantial lose of alumina accompanies the initial rapid iron chlorination under reducing conditions. Even if this loss could be tolerated the remaining iron is too high for producing cell grade alumina or aluminum chloride."

U.S. Pat. No. 3,842,163, A. S. RUSSELL ET AL, entitled "Production of Aluminum Chloride" and assignors to Aluminum Company of America, state, to quote lines 45 to 58:

"In general, the reduction of aluminum-containing materials with chlorine in the presence of reducing carbon in some form to produce aluminum chloride is an old and generally well-known reaction and one of the suggested expedients referred to above utilized Bauxite as the alumina containing material. Bauxite however, normally contains many impurities including iron oxide, silica, and titania. Since these impurities readily react with chlorine in the presence of carbon to form iron, silicon, and titanium chlorides, the usual gaseous aluminum chloride reaction effluent therefrom must be subjected to cumbersome and expensive after-purification measures if these chloride contaminants are to be separated to provide even a reasonably pure aluminum product."

The United States Department of the Interior, Information Circular i412 by Robert L. de Beauchamp, sums up the problem of producing $AlCl_3$ from various materials on page 6, the last paragraph reading as follows:

"The raw materials that may be used for the preparation of $AlCl_3$, include bauxite, clays, shale, anorthosite, coal ash, and many other aluminum containing materials. Bauxite or clays are the most logical choices because of their higher $Al_2O_3$ contents and the large reserves of these materials available. Iron is the impurity most deleterious to the process since it uses up chlorine and is difficult to remove from the product."

Canadian Pat. No. 569,830 to Groth in 1959 describes a method for chlorinating aluminiferous materials by treating dehydrated and crushed raw materials with aluminum chloride vapor at 600° C.–900° C., removing hot reaction gases containing iron chloride and titanium chloride, and the excess of the added aluminum chloride, treating the residue with chlorine and a reducing agent, and processing the recovered aluminum chloride vapor containing silicon chloride and carbon monoxide at temperatures above 800° C. with alumina or aluminiferous materials free from iron and titanium. In this process, however, the chlorinating agent is pure fresh aluminum chloride uncontaminated by reaction products. Further, the gases recovered from the chlorination process are oxidized to convert at least the chlorides of iron and titanium to their oxides prior to condensation. Therefore, because of the oxidation step, chlorides of the materials are not recovered in reusable form. Further, the vapor mixture recovered cannot be diluted with CO in order that the oxidation stage can be carried out.

In contrast to Groth, in the present invention I may use a number of low cost and novel stages to remove the iron from the material being treated prior to the final stage of mass chlorination of the contained $Al_2O_3$ thus eliminating to a large degree the most difficult problem of separating the iron chlorides from the final aluminum chloride product. In use of a single chlorination stage, in contrast to Groth, I an not limited to dilution by such gases as $N_2$ and CO (Groth, Column 1, lines 55–60), nor am I dependent upon the conversion of all of the chlorides produced to the oxides (Groth, Column 1, lines 60–70, and Column 2, lines 1–33). Also, I use recycle impure $AlCl_3$ as the major chlorination agent.

SUMMARY OF THE INVENTION

It is accordingly a primary object of the present invention to provide a novel process for the production of a relatively iron and titanium free product as alumina or aluminum chloride from Bauxites, Bauxitic Clays, and Clays, or any other suitable aluminum bearing material that will respond to my process.

A further object of the present invention is to provide a novel and low cost process for the production of a relatively iron free product from Bauxites, Bauxitic Clays, and Clay for use in the refractory and chemical industry.

A still further object of the present invention is to provide a novel and low cost process for the production of a relatively iron and titanium free product for the production of aluminum-silicon alloys, eliminating the use of the costly Bayer Process.

A still further object of the present invention is to provide a novel and low cost process for the production of aluminum chloride from Bauxites, Bauxitic Clays, and Clays wherein the iron and titanium have previously been removed from the raw materials prior to the mass chlorination stage to produce the bulk of the aluminum chloride resulting in a purification step of separating only two major gaseous products, that is aluminum trichloride, and silicon tetrachloride, essentially free of iron chlorides.

Other objects and advantages of the claimed invention will become apparent as the description thereof proceeds.

In satisfaction of the foregoing objects and advantages there is presented by this invention in its broadest concept a process for the production of aluminum oxide, that is $Al_2O_3$, and aluminum chloride, that is $AlCl_3$, from various materials containing aluminum oxide minerals and complex aluminum minerals such as Kaolinite, that is $Al_2O_3.2SiO_2.2H_2O$, the process comprising:

(a) Preselection of the material to be treated in that the feed material to the first chlorination stage has a total iron content calculated as $Fe_2O_3$ of a maximum of 8% and preferably less than 5%; this maximum amount of iron enabling the use of starvation quantities of the chlorine radical for the production of the requisite amount of $AlCl_3$ and/or $AlCl_3$-$SiCl_4$ for cycling to the number one chlorination stage;

(b) dehydrating to remove free and chemically combined water, and where such minerals as Kaolinite are present to break the chemical bond of $Al_2O_3$, $SiO_2$, and $H_2O$, driving off the $H_2O$ as water vapor and forming amorphous $Al_2O_3$ and amorphous $SiO_2$, which products respond differentially to chlorination treatment;

(c) Number One Chlorination Stage in which the major chlorinating agent is $AlCl_3$ or mixture of $AlCl_3$ and $SiCl_4$. The $AlCl_3$ differentially chlorinates the iron and titanium minerals and allows their bulk removal as chlorides, the $AlCl_3$ that is used up in converting the iron and titanium minerals to their respective chlorides being converted to $Al_2O_3$ which is subsequently recovered in the process as $Al_2O_3$ or purified $AlCl_3$.

Where the production of an $Al_2O_3$ product essentially free of iron is required, this is the final stage of the process.

In some cases it may be economically justifiable to carry part of the titanium to the Number Two Chlorination Stage where titanium tetrachloride, that is $TiCl_4$, can be readily separated from $AlCl_3$ and $SiCl_4$, and combined with the $SiCl_4$ from the recovered $TiCl_4$ in the effluent gases of the Number One Chlorination Stage.

(d) Number Two Chlorination Stage is primarily for the production of $AlCl_3$ and $Al_2O_3$ not only essentially iron and titanium free, but also low in silicon. The Number Two Chlorination Stage involves mass chlorination of the $Al_2O_3$ content of the material and for optimum results, an excess of chlorine radical over the sufficient amount required to convert the $Al_2O_3$ to $AlCl_3$ is normally used. Chlorine gas itself is normally used in this stage with a reducing agent present selected from the group consisting of Carbon, Carbon Monoxide, $COCl_2$, and $CCl_4$.

The purified $AlCl_3$ product can be, if desired, converted to purified $Al_2O_3$ by known means such as burning in oxygen forming $Al_2O_3$ and the freed chlorine cycled back to the number two chlorination stage.

In the preferred embodiment of my invention and particularly in treating Bauxites, Bauxitic Clays, and Clays, I use a unique low cost circuit for removal of at least a high percentage of the contained iron minerals. This circuit consists of at least one high magnetic intensity cobbing step using a magnetic field strength of at least 11.0 kilogauss, and preferably at least two high intensity magnetic cobbing steps. The magnetic field strength is preferably in the range of about 12.0 kilogauss to about 22.0 kilogauss.

I may also use one or more steps of desliming in conjunction with the high intensity magnetic cobbing circuit.

In using one or more desliming steps I prefer to magnetically cob prior to desliming and in some cases, also following desliming. I may also use magnetic cobbing following dehydration. However, this involves additional costs of materials handling, filtering and drying which I prefer to avoid.

This unique circuit will be described in more detail as the invention description and examples are illustrated.

The following will define for clarity various terms used in describing the invention:

Magnetic Cobbing—passing a prepared pulp of the material through a magnetic field to remove from the material a magnetic concentrate containing a large percentage of at least the iron minerals which is rejected as waste, and nonmagnetic product that analyzes appreciably lower in at least iron than the original feed material, and containing a high percentage of the original aluminum minerals contained in the material.

Desliming—separation of the ultra fine particles of the prepared material from the coarser fraction.

In the practice of my invention this separation is usually carried out at 2.0 to 10.0 microns, with the minus fraction to waste or some other use such as the Bayer Process, and the plus 2.0 to plus 10.0 microns as the retained product for subsequent chlorination. This desliming step is carried out where a relatively high percentage of the iron and titanium minerals in the minus 2.0 to minus 10.0 micron sized ranges will not respond to high magnetic intensity cobbing and the loss of aluminum minerals in this product is either economically acceptable, or that little or no loss of the aluminum minerals takes place where such product can be economically fed to a Bayer Process.

Dehydration—also known as calcination—this terminology as used in this patent means that following:

(a) Removal of any free moisture as steam.

(b) Breaking down of the bond of water of crystallization in aluminum oxide minerals having the chemical analysis of $Al_2O_3.xH_2O$, wherein a high percentage of water of crystallization is driven off as steam.

(c) Breaking down of the chemical bond or bonds of complex aluminum minerals such as Kaolinite, $Al_2O_3.2SiO_2.2H_2O$, wherein the $H_2O$ is driven off as steam and the $Al_2O_3$ and $SiO_2$ are converted into amorphous $Al_2O_3$ and amorphous $SiO_2$ respectively. To accomplish satisfactory dehydration of Bauxites, Bauxitic Clays and Clays, a temperature range of about 625° C. to 1050° C. may be used. The form of $Al_2O_3$ begins to change at about 1000° C. from gamma to alpha alumina. The alpha alumina is appreciably more difficult to chlorinate than the gamma alumina. For this, and economic reasons, 1050° C. is the upper limit for preferred operation. It will be appreciated that the effectiveness of the dehydration step is a primary function of temperature and time. My preferred temperature range of dehydration is about 650° C. to 1000° C., the economic optimum being readily determined by anyone skilled in the art.

Bauxites and Bauxitic Clays—there is a thin line in these definitions. The difference between Bauxites and Bauxitic Clays is essentially the percentages of $Al_2O_3.xH_2O$ minerals contained in the materials. Where practically all of the silica in these materials is present as Kaolinite, the relative percentages of silica are taken as the definitive separation point. For instance, Arkansas Bauxites can be defined as containing approximately less than 16% $SiO_2$, and Arkansas Bauxitic Clays, more than 16% $SiO_2$.

Clays—generally refer to materials containing little or no $Al_2O_3 \cdot xH_2O$ minerals and the major aluminum mineral component is essentially Kaolinite.

Aluminum Chloride—$AlCl_3$ or $Al_2Cl_6$ or mixtures thereof.

Alumina—$Al_2O_3$.

Iron and titanium—the standard practice of the aluminum industry is to report Fe and Ti analyses as $Fe_2O_3$ and $TiO_2$. The iron and titanium minerals contained in the aluminum bearing materials vary considerably and are but rarely only in the form of $Fe_2O_3$ and $TiO_2$. For instance the major iron mineral in Arkansas Bauxite is siderite, $FeCO_3$, and the commonest occurring form of titanium is as ilmenite, $FeOTiO_2$. When I refer to percentages of $Fe_2O_3$ and $TiO_2$ herein, I mean the chemical analyses as Fe and Ti converted to $Fe_2O_3$ and $TiO_2$, respectively.

Alkaline Agent—an agent used to raise or maintain the pH of the pulp within certain optimum pH ranges. The alkaline agents that may be used in this process are alkaline dispersing agents selected from the group consisting of sodium hydroxide, potassium hydroxide, ammonium hydroxide, sodium carbonate, and mixtures thereof as described herein.

Dispersing Agents—families of dispersants such as lignins, phosphates, silicates, or any other family of specific dispersants which may be economically used to disperse the solids contained in the pulp of the raw material, and which in combination with at least one Alkaline Agent, sodium hydroxide, in specific pH ranges, combines to result in the unique and outstanding metallurgical results in removing iron and titanium minerals from the material by high intensity magnetic separation.

In combining one or more Dispersing Agents with at least sodium hydroxide as the Alkaline Agent I have found that for optimum results in removing iron and titanium minerals from the feed material by high intensity magnetic separation, I require the pH of a pulp of the material to be raised by at least sodium hydroxide as the alkaline agent and preferably at an optimum pH point in the range of 9.5 to 12.0.

Catalysts—the catalysts that may be used in my Chlorination Stages are selected from the group consisting of sodium chloride-NaCl, potassium chloride-KCl, sodium aluminum chloride-$NaAlCl_4$, and potassium aluminum chloride-$KAlCl_4$.

The usual effect of this family of catalysts in the chlorination processes is to speed up rates of reaction, and in some cases to lower the operating temperatures, an in other cases to increase the recovery of the aluminum minerals as chlorides.

"Starvation amounts of chlorine"—this descriptive phrase, in the context of this patent, basically refers to the amount of chlorine that is added to the circuit to replace an equal amount of chlorine that is removed from the circuit in the form of ferric chloride and/or ferrous chloride.

DESCRIPTION OF THE PREFERRED EMBODIMENTS

In the use of high intensity magnetic separation as the first major process step in removing a high percentage of the contained iron and/or iron and titanium from the feed material, the preparation of the feed material prior to the magnetic separation circuit is important.

If the original feed material is too coarse a size as feed to a comminution unit such as a rod mill or ball mill, I firstly crush and if necessary screen the feed material to the appropriate size and feed it to at least one stage of wet grinding. To this at least one stage of grinding I add at least sodium hydroxide as a combined alkaline and dispersing agent preferably controlling the pH in the range of about 9.5 to about 12.5. If I combine dispersing agents with at least NaOH as the alkaline agent I may reduce the lower end of the pH range to about 8.5. By this means I obtain high efficiency in my grinding circuit using pulp densities as high as 55% solids, with good liberation of the magnetically susceptible minerals, and in particular, the iron minerals.

Without the above noted use of alkaline agents either alone or in combination with dispersing agents, it would be impossible to operate at such densities with many of the aluminum bearing materials.

My preferred range of pulp density in the at least one wet grinding mill is 45% to 55% solids.

Following the at least one wet grinding mill I prefer to dilute the pulp to 5% to 45% solids dependent on the pulp density I subsequently use to the first stage of magnetic separation. Following the dilution of the pulp I prefer to screen the solids using one or more screens in the range of 20 to 65 Tyler Mesh. The oversize from the screening circuit may be sent to waste containing mostly wood which occurs with the feed material, or alternately part or all of the oversize can be returned to the wet grinding circuit.

The undersize may be fed as is or further diluted to the at least one stage of high intensity magnetic separation.

My preferred range of pulp densities to this stage is in the range of about 10% to 40% solids. I prefer to use at least two stages of high intensity magnetic separation. The magnetic concentrate or concentrates may be sent to a thickener or tailings pond where the solutions are recovered and recirculated to the magnetic or grinding circuits or alternately the thickener underflow containing the magnetic concentrate or concentrates reground to liberate further aluminum bearing minerals which may be recovered by an additional stage or stages of magnetic separation treatment.

Following the magnetic circuit the nonmagnetic fraction of the feed material may be sent to a thickener, followed by a filter or other means of bulk solution removal such as a centrifugal separator, and the filter cake or centrifugal cake sent to storage for partial air drying prior to drying and dehydration or directly to dehydration. Alternately, the nonmagnetic fraction may be subjected to a de-sliming operation using conventional equipment such as cyclones, hydroseparators, centrifuges, and thickening-sizer apparatus such as is used in iron ore beneficiation and well known in the art.

I only use a de-sliming circuit where substantial amounts of iron occur in the minus 2.0 to minus 10.0 micron size range and which iron-bearing minerals do not effectively respond to my magnetic separation circuit. Further, this de-sliming circuit involves a loss of some of the aluminum bearing minerals, and if such loss is too high it precludes the use of this circuit. If the losses in aluminum bearing minerals is within acceptable economic limits, or the contained aluminum bearing minerals can be used and treated in other processes such as the Bayer Process, then there is economic justification for the use of this de-sliming circuit in treating specific materials.

Following the de-sliming circuit, I may or may not use a further stage of high magnetic intensity separation on the plus 2 to plus 10 micron sized fraction. The use of such an additional stage is dependent upon the amount of residual magnetically susceptible iron and/or iron and titanium minerals that can be removed and the economists of adding such a stage to the overall circuit.

Dehydration—the dehydration circuit involves evaporating any free moisture in the nonmagnetic fraction or feed material to this stage together with driving off the water of crystallization contained in aluminum oxide minerals represented by the chemical analysis of $Al_2O_3.xH_2O$ and complex aluminum minerals such as Kaolinite, $Al_2O_3.2SiO_2.2H_2O$ and additionally to break the $Al_2O_3.SiO_2$ bond to form amorphous $Al_2O_3$ and amorphous $SiO_2$ that will subsequently respond differentially to chlorination.

This stage of the circuit uses conventional equipment well known in the art, and consists of such equipment as horizontal rotary kilns, vertical shaft furnaces, or fluosolids reactors.

Time and temperature are important.

The temperature range of dehydration is about 625° C. to 1050° C.

My preferred range is 650° C. to 1000° C. dependent on the material being treated and the temperature used. The residence time in the dehydration unit may vary from a minimum of 15 minutes to a maximum of 4.0 hours.

The optimum time and temperature can be readily obtained by one skilled in the art.

Number One Chlorination Stage—Following dehydration the material is subjected to chlorination in conventionally used equipment such as horizontal rotary kilns, vertical shaft furnaces, and fluo-solids reactors. The treatment of the gases produced involves using controlled temperatures of condensation and in some cases controlled fractional distillation of the liquids and solids produced. The equipment used is again conventional and not described herein as it is well known in the art. In this stage I use aluminum trichloride as the major chlorinating agent to convert the iron and titanium minerals remaining in the material, or originally contained in the material, to their respective chlorides. I may use pure aluminum trichloride in the solid or gaseous form, but I prefer to use impure aluminum trichloride in the gaseous form containing minor amounts of such chlorides as iron chlorides, and minor to major amounts of silicon tetrachloride, and carbon monoxide and carbon dioxide in various quantities, all which will be further described herein.

In using my preferred embodiment of the invention I produce the requisite amount of aluminum trichloride or aluminum trichloride combined with silicon tetrachloride in a Number Two Chlorination Stage using free chlorine or $COCl_2$, to chlorinate the contained aluminum minerals and then returning part of the gas stream produced to the number one chlorination stage, or alternatively a portion of the condensed $AlCl_3$ is returned to the number one chlorination stage. Under such a condition of operation, the gases from the number one chlorination stage will contain substantially all of the iron and titanium as chlorides and residual $AlCl_3$.

In separating the various constituents of the gas stream two basic methods may be used, or combinations thereof. The first method uses controlled temperatures of condensation, and the second method condensing all of the chlorides to their liquid or solid form with the $CO-CO_2$ either partially returned to one or more points in the chlorination circuit with part going to waste, or all going to waste, or part or all to the dehydration stage. The chlorides are fractionally distilled at controlled temperatures to produce a relatively pure $SiCl_4$ which I prefer to return to number two or number three chlorination stage or to both, a relatively pure $TiCl_4$ which I prefer to convert to $TiO_2$ and Cl by burning in oxygen by means well known in the art and with the $TiO_2$ as a final commercial product and the recovered Cl returned to number two or number three chlorination stage.

For boiling points of the various chlorides and the aluminum chloride-ferric chloride and titanium tetrachloride-silicon tetrachloride fractional separations, reference is made to U.S. Pat. Nos. 317,259 and 2,387,228.

The advantages and differences of the number one chlorination stage over any of the previous art known to the inventors are outstanding and are as follows:

(a) The use of $AlCl_3$ or in combination with starvation quantities of chlorine to differentially chlorinate the contained iron and titanium minerals, and as these minerals are comparatively low in weight through preselection of the feed material or application of my beneficiation processes or a combination of both, only a small gas stream is being handled as compared to total chlorination of the contained alumina which results in substantially all of the contained iron and titanium minerals and at least part of the contained $SiO_2$ being also chlorinated.

(b) Excess $AlCl_3$ that is used is recovered at a low cost as an impure $AlCl_3$ containing $FeCl_3$ and returned to the Number One Chlorination Stage without any deleterious affects on chlorinating the contained iron and titanium minerals.

In the number two chlorination stage, dependent on the reducing agent employed, and whether or not catalysts or HCl are used, the chlorination may vary over a wide range, that is about 500° C. to about 1000° C. Reference—"Landsberg", Metallurgical Transactions, Volume 8B, September 1977, pg. 435, and "English", Defence Research Chemical Laboratories, Ottawa 2, D.R.C.I. Report No. 75A.

Number Two Chlorination Stage—The solids feed materials to this final stage of chlorination will be essentially iron free and preferably titanium free and as the two stages come into metallurgical balance, this feed material will contain all but a minor percentage of the alumina contained in the feed material to Number One Chlorination Stage. In the Number One Chlorination Stage minor losses of alumina could take place as solids with the final iron chloride residue or in the scrubber product removing part or all of the $CO-CO_2$ contained in the effluent gases. Thus, the only major separation to be made in this stage is $Al_2O_3-SiO_2$.

To accomplish this separation, and for maximum recovery of the $Al_2O_3$ and $AlCl_3$ I prefer to use an amount of Cl radical either as chlorine or phosgene in the presence of sufficient reducing agent selected from the group consisting of C and CO with the chlorine radical at least in slight excess which will result in chlorination of part of the silica.

The separation of $AlCl_3$ and $SiCl_4$ is readily accomplished by differential temperature condensation or by condensing the $AlCl_3$ and $SiCl_4$ together and following with a fractional distillation and condensation system to produce an essentially silicon free aluminum chloride.

The reasons why the $AlCl_3$ and $SiCl_4$ can be so readily separated is the large difference in their boiling points, about 183° C. for $AlCl_3$ and about 59° C. for $SiCl_4$. Reference—U.S. Pat. No. 2,387,228.

My final products will thus be $SiO_2$ with a minor amount of $Al_2O_3$ and possibly other trace impurities, and relatively pure $AlCl_3$.

The major differences of my Number Two Chlorination Stage over any of the previous art is the feed material which is essentially iron free and preferably titanium free containing only two major components to separate, that is $Al_2O_3$ and $SiO_2$.

BRIEF DESCRIPTION OF THE DRAWINGS

Reference is now made to the drawings accompanying the present application where it will be seen that:

FIG. 6 shows the flowsheet used for Examples 6 and 7.

FIG. 7 shows a two stage chlorination process of the invention.

FIG. 8 shows a three stage chlorination process of the invention.

DETAILED DESCRIPTION OF THE DRAWINGS

Figure 1:
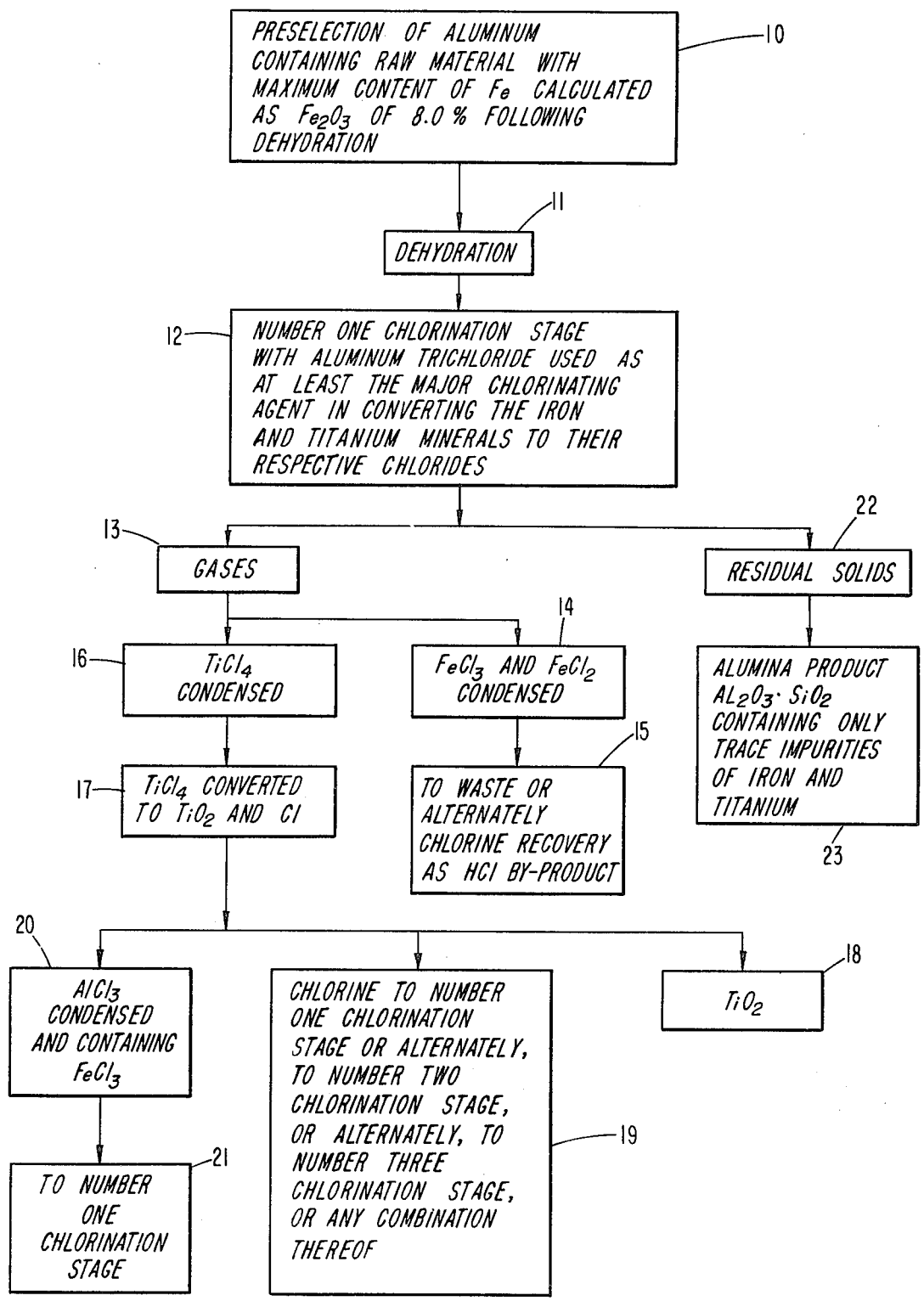
FIG. 1 shows the simplest flowsheet of the invention.

FIG. 1 shows the simplest flowsheet of the invention. In my preferred embodiment of the invention I preselect the aluminum containing raw materials shown at 10 with a maximum iron content calculated as $Fe_2O_3$ of 8.0%. This is the analysis following the dehydration stage in the process. Following the preselection of the material it is dehydrated as defined in the specification and shown at 11. The temperature of this dehydration stage is in the range of about 625° C. to 1050° C. and preferably between about 650° C. to 1000° C. In order to conserve the heat units of the product following this stage, I prefer to feed this product directly into the Number 1 chlorination stage shown at 12 in which the major chlorination agent is aluminum trichloride. I prefer to produce the required aluminum trichloride in a second chlorination stage shown in FIG. 2 at 30.

Figure 2:
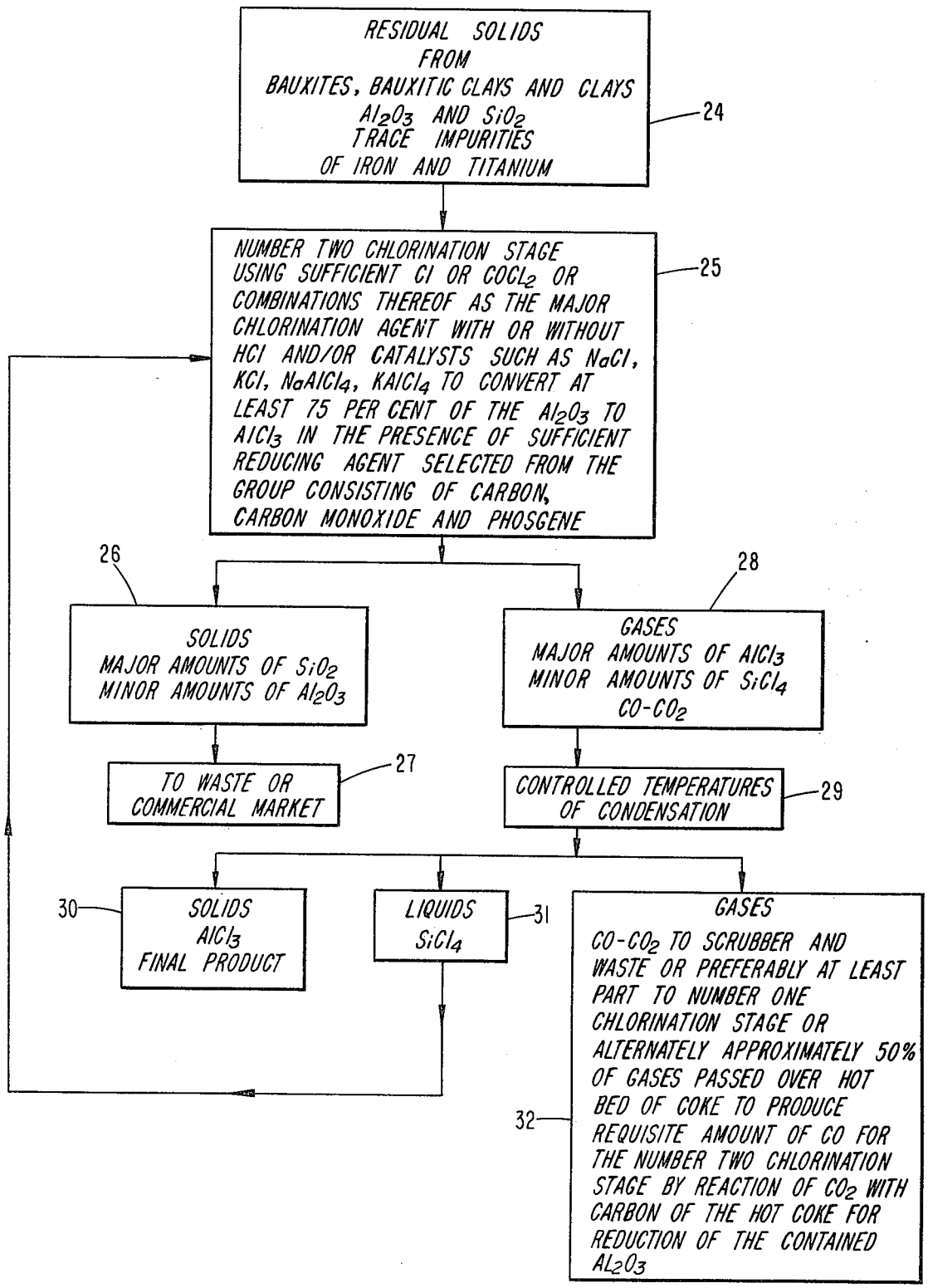
FIG. 2 shows the simplest flowsheet of the invention to obtain separation of $Al_2O_3$ and $SiO_2$ to produce a purified $AlCl_3$.

Following the Number 1 chlorination stage, the residual solids shown at 22 proceed to the Number 2 chlorination stage shown in FIG. 2 at 25. The gaseous effluent from the Number 1 chlorination stage shown at 13 will contain practically all of the originally contained iron in the raw material and preferably essentially all of the titanium. The gases shown at 13 may be treated by controlled condensation or by condensing all of the gases with the exception of possibly CO and $CO_2$, which gases will either be sent to a scrubber or preferably to the dehydration stage.

In the order of condensation the ferric chloride shown at 14 condenses at approximately 318° C. However, as the aluminum trichloride has a solubility in the ferric chloride, a part of the contained aluminum trichloride will also be brought down with the ferric chloride. If the ferric chloride and the aluminum chloride are condensed together, the condensation point of pure aluminum trichloride is 183° C., but in a mixture of aluminum trichloride and ferric chloride vapor, this condensation point will be raised to a higher temperature. For this reason, I may condense the ferric chloride and aluminum trichloride together and then fractionally distill off the aluminum trichloride at the lowest possible temperature. Under these conditions it will still contain a small percentage of ferric chloride. This impure aluminum chloride I cycle back to the Number 1 chlorination stage where the contained ferric chloride will have no effect on the process and the recovered aluminum trichloride will maintain its usefulness as a major chlorinating agent for the contained iron and titanium minerals in the raw material feed. The residual ferric chloride would normally be sent to waste.

The condensation temperature of the titanium tetrachloride is 136° C. and the silicon tetrachloride is 59° C. Both of these chlorides can be readily separated from the gas stream by controlled condensation or by condensing both together and using fractional distillation. The titanium tetrachloride I prefer to convert to titanium oxide and free chlorine by burning with oxygen by well known means to the art. Where I use a single chlorination stage I return the recovered chlorine shown at 19 together with additional amounts of chlorine lost as ferrous and ferric chloride shown at 14 to the single chlorination stage shown at 12 together with the requisite amount of carbon or carbon monoxide to convert sufficient of the $Al_2O_3$ in the raw material shown at 14 to aluminum trichloride which together with the recycled impure $AlCl_3$ shown at 20 efficiently chlorinates the condensed iron and titanium minerals in the feed material.

The residual solids shown at 22 from the Number 1 chlorination stage will normally contain aluminum oxide and silicon dioxide with preferably only trace impurities of iron and titanium. Where a commercial product of such material is required, such as in the refractory industry, or to produce aluminum silicon alloys, this will be the final product of the process. As shown in FIG. 2 at 25, if a separation of the aluminum oxide and silicon oxide is required, this product is subjected to a Number 2 chlorination stage which is further described herein.

FIG. 2 shows the simplest flowsheet of the invention to obtain separation of the aluminum oxides from the silicon dioxides contained in the solids component of the process following the Number 1 chlorination stage of the invention as shown in FIG. 1.

The feed material as shown at 24 for the Number 2 chlorination stage of the invention and as produced at 22, FIG. 1, is fed at 24 to the Number 2 chlorination stage of the invention shown at 25 using sufficient chlorine radical or preferably an excess thereof, and in the presence of sufficient reducing agent to convert the contained aluminum oxide to aluminum trichloride. I may or may not use catalysts in this stage. If I do use catalysts they are selected from the group consisting of sodium chloride, potassium chloride, sodium aluminum chloride and potassium aluminum chloride. The gases from this stage shown at 28 will contain all of the recoverable aluminum trichloride with various amounts of silicon tetrachloride and CO and $CO_2$.

As previously described, the aluminum trichloride and silicon tetrachloride can be readily separated by controlled temperatures of condensation shown at 29 or alternately, condensing all of the aluminum chloride and silicon tetrachloride together, and then fractionally distilling off the silicon tetrachloride (not shown). Further, a combination of condensation and fractional distillation may be also used by means well known to the art (not shown).

The remaining gases following removal of the aluminum trichloride and silicon tetrachloride, shown at 32, will be CO and $CO_2$ which may go to a scrubber and waste or preferably approximately 50% of the gases produced are passed through a hot bed of coke to convert the contained $CO_2$ to CO by reaction of the $CO_2$ with carbon of the coke for recycled to primarily the number two chlorination stage for reduction of the $Al_2O_3$ and its conversion to $AlCl_3$. Where starvation amounts of chlorine are used in the number one chlorination stage, minor amounts of the CO thus produced would be cycled to this chlorination stage with the major amount to the number two chlorination stage.

The purified silicon tetrachloride, shown at 31, is preferably heated to above 59° C., its boiling point, and preferably cycled to the Number 2 chlorination stage.

The aluminum trichloride will be in the solid form as $AlCl_3$, shown at 30, and is the final product produced from the process.

The remaining solids, shown at 26, will contain a high percentage of the original $SiO_2$ in the raw material and minor amounts of $Al_2O_3$. This product shown at 27 will either go to waste or to commercial market.

Figure 3:
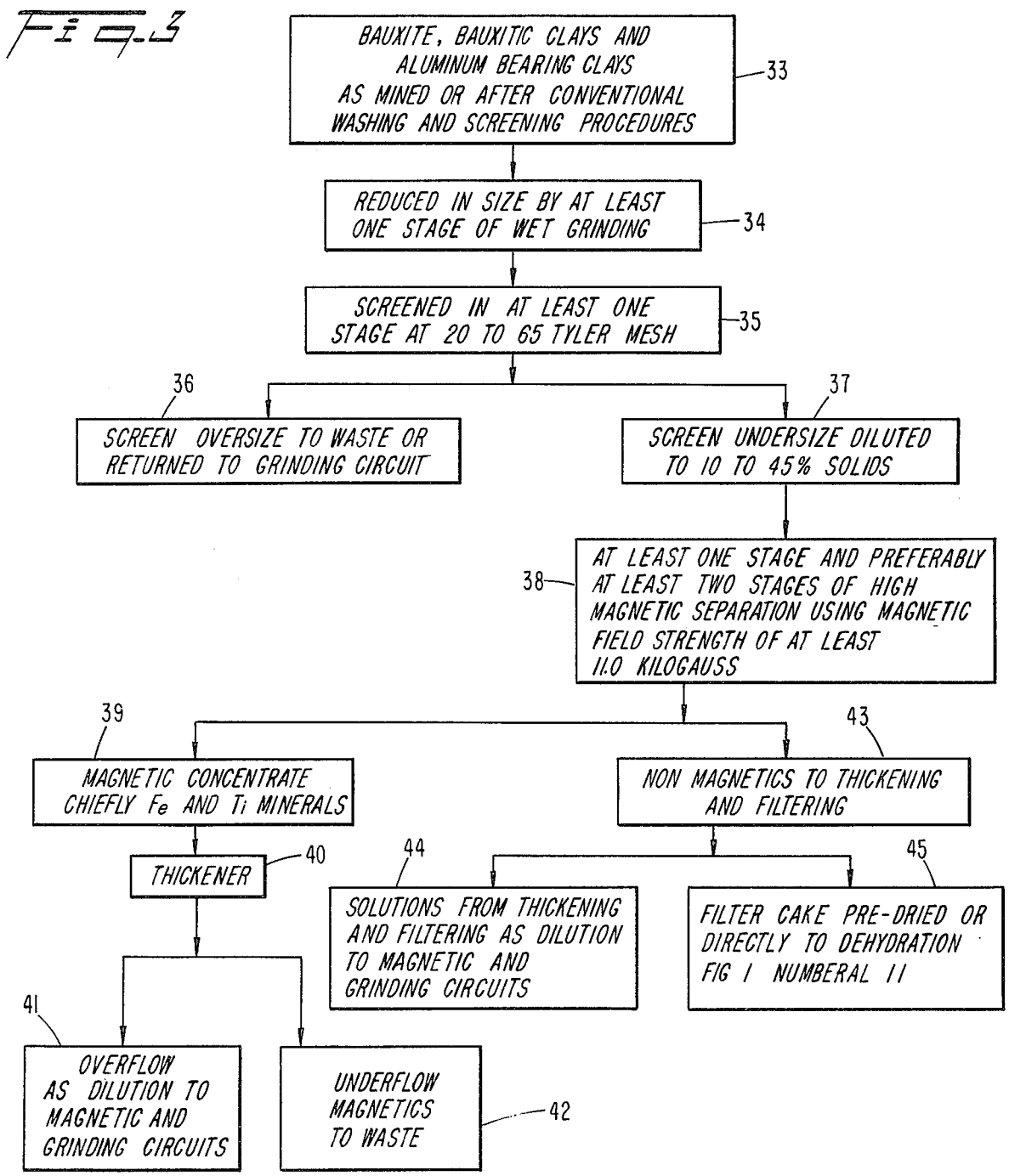
FIG. 3 shows a preferred flowsheet of the invention using at least one beneficiation stage on the original feed material involving high intensity magnetic separation.

FIG. 3 shows a preferred flowsheet of the invention using at least one stage of high intensity magnetic separation prior to dehydration as shown in FIG. 1. As shown at 33, the preferred materials in this flowsheet are bauxite, bauxitic clays and alumina bearing clays as mined or after conventional washing and screening procedures or, the requisite crushing and screening to produce a suitable size material to at least one stage of wet grinding as shown at 34 and normally consists of at least one stage of rod mill or ball mill grinding. Following this wet grinding stage I prefer to screen the material as shown at 35 at between 20 to 65 Tyler Mesh. The oversize from the screening may consist mainly of wood normally found with the raw material, and as such would be sent to waste. If there is an appreciable amount of oversize in the raw material, it would be returned to the at least one wet grinding stage.

The screen undersize shown at 37 may be diluted to between about 10 and 45% solids which is dependent on the desired percentage of solids to the next stage shown at 38. This stage uses at least one stage of high intensity magnetic separation using a magnetic field strength of at least 11.0 kilogauss. The magnetic concentrate product shown at 39 consists chiefly of iron and titanium minerals and normally is fed to a thickener 40 with the thickener overflow 41 returned as dilution to the magnetic and grinding circuits. The thickener underflow 42 is normally sent to waste.

The non-magnetic fraction produced shown at 43 is sent to thickening and filtering with the solution, 44, from thickening and filtering, as dilution to the magnetic and grinding circuits. The filter cake produced, 45, may be sent to predrying or directly to dehydration as shown in FIG. 1, reference numeral 11, and the flowsheet from there on would be the same as FIG. 1, reference numeral 12, and proceeding through the remaining stages shown.

Figure 4:
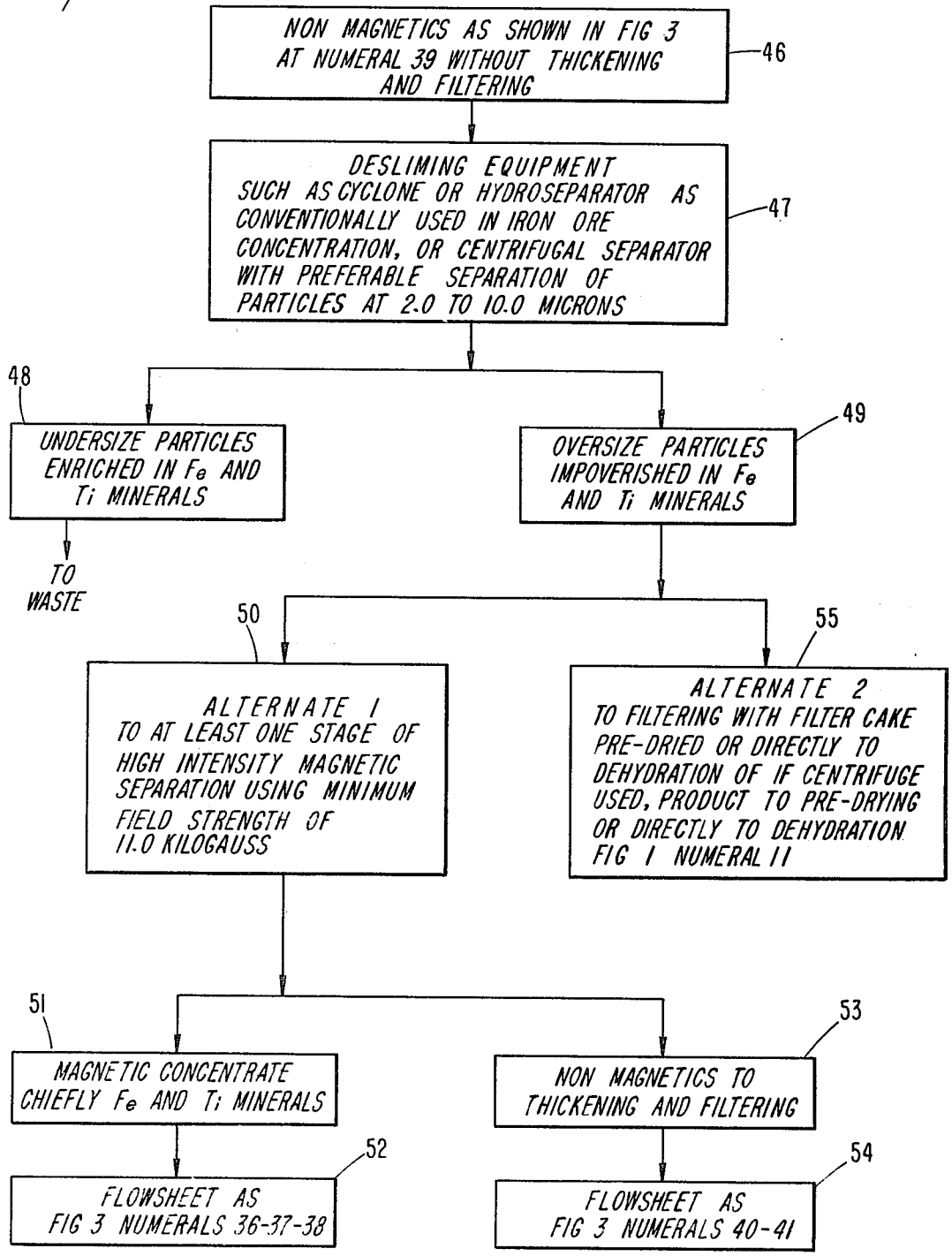
FIG. 4 shows a preferred flowsheet of the invention using at least two beneficiation stages on the original feed material and involving high intensity magnetic separation and de-sliming.

FIG. 4 is a preferred flowsheet of the invention using at least one stage of high intensity magnetic separation and at least one stage of de-sliming prior to dehydration as shown in FIG. 1 at 11. The non-magnetic fraction 46, as shown in FIG. 3 at 43, without thickening and filtering, flows to de-sliming equipment 47 such as a cyclone or hydroseparator as conventionally used in iron ore concentration, or a centrifugal separator with preferable separation of particles at 2.0 to 10.0 microns, although I may use separations as coarse as 200 Tyler Mesh.

The undersize particles shown at 48 are enriched in iron, titanium and silicate minerals and would normally be sent to waste but under some conditions of separation can be high enough in alumina content to justify recovering and feeding to a circuit such as the Bayer Process for the recovery of the contained alumina. The oversize particles shown at 49 are impoverished in iron, titanium and silicate minerals and preferably are treated in two alternate ways. Alternate 1 shown at 50 is fed to at least one stage of high intensity magnetic separation using a minimum field strength of 11.0 kilogauss from which is produced a magnetic concentrate shown at 51 which will contain chiefly iron and titanium minerals and which product is shown at 52, and will be treated as FIG. 3, reference numerals 40, 41 and 42. The non-magnetic fraction produced, shown at 53, will be sent to thickening and filtering, and as shown at 54, will be treated the same as in FIG. 3, reference numerals 44, and 45.

Figure 5:
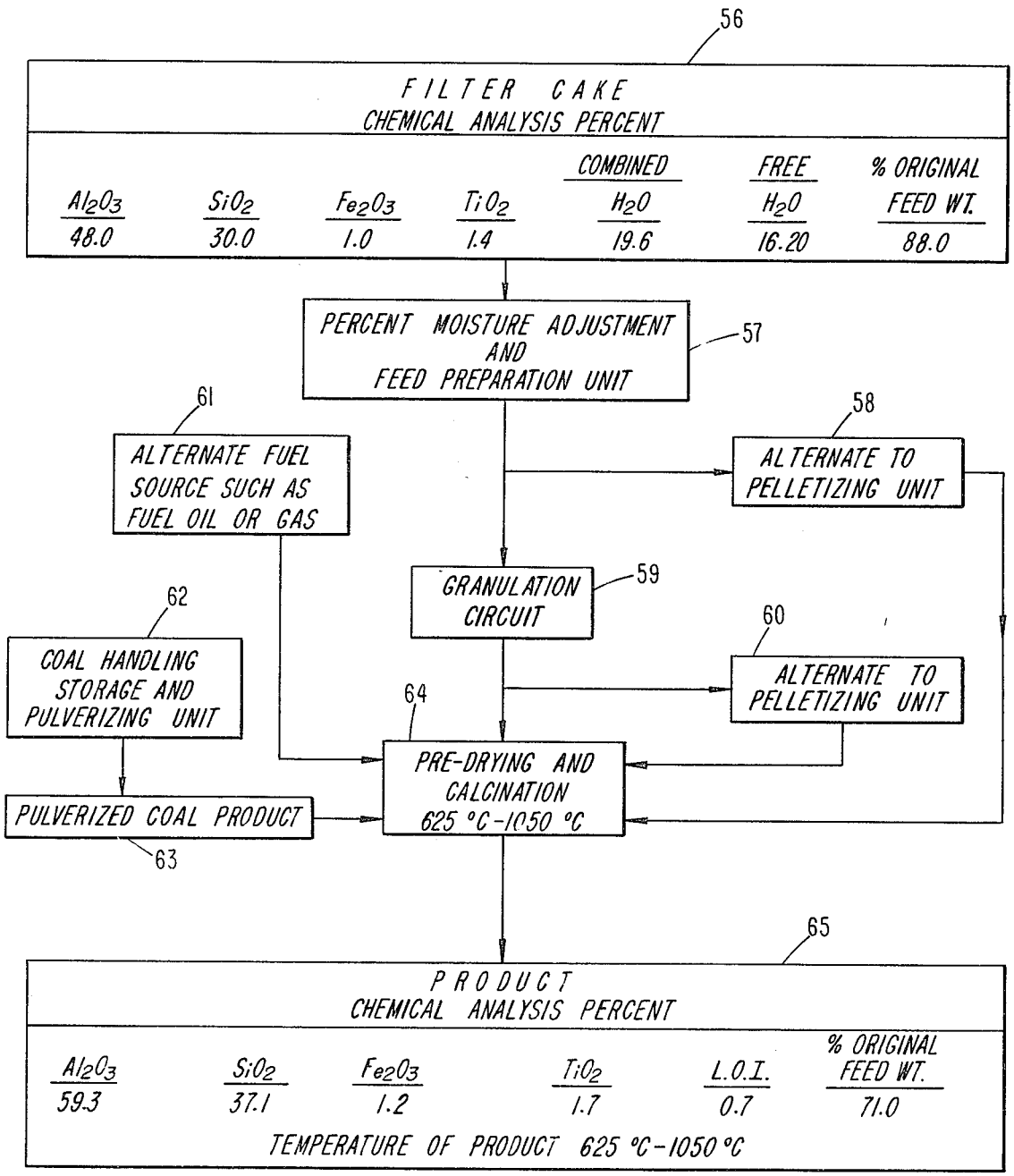
FIG. 5 shows the flowsheet of the invention using granulation, pelletizing, or a combination of both.

In a preferred embodiment of my invention in particularly treating aluminum bearing clays and bauxitic clays, the filter cake shown in FIG. 4 at 55 is treated as shown in FIG. 5. This was a filter cake produced from Arkansas Bauxitic Clay in accordance with the flowsheet as shown in FIG. 3.

The filter cake 56, FIG. 5, was air dried to approximately 10% moisture and was charged into a mix-muller manufactured by National Engineering Company, and not shown, but incorporated into feed preparation unit at 57. Water was added until the moisture content reached approximately 20%. The resultant mixture was passed through a Tornado Mill manufactured by Stokes Division, Penn Walt Corporation, not shown, and was equipped with replacable screens of different size openings, not shown. The material passing through the screens was passed through a horizontal rotating device which affected rounding of the pellets and elimination of extreme fines which are returned to the mix-muller. Control over particle size was maintained by variations in moisture content of the mix-muller discharge and the size of the replacable screen openings. Where the step of pre-drying the filter cake is not carried out and the moisture content of the filter cake is too high for granulation and/or pelletizing I prefer to circulate part of the pre-dried product shown at 64 to the mix-muller and adjust the moisture content of the product in this manner.

The formation of the granules and/or pellets prior to calcination may be an important part of my invention in particularly treating very fine material which could show major losses in aluminum bearing minerals particularly in the calcining stage where large volumes of gases are produced.

FIG. 6 shows the flowsheet used for Examples 6 and 7. In this flowsheet the dehydrated feed material was mixed with various percentages of aluminum chloride shown at 66, fed to a screw feeder 67 which was heated by a Bunsen burner to approximately 500° F. to 800° F. (260° C. to 426° C.) and assisted in its conveyance to a fluo-solids reactor at 71 by carbon monoxide. The carbon monoxide was stored under pressure at 68 and fed through a flow meter and gas volume controller at 69, preheated at 70 to a temperature of approximately 1700° F. (926° C.) and fed with the feed material from 67 to the fluo-solids reactor 71 with the temperature of the feed at about 550° F. to 850° F. (287° C. to 454° C.), the bed temperature in the fluo-solids reactor was 1400° F. to 1500° F. (760° C. to 815° C.). The calculated residence time of the feed in the reactor was 45 minutes. From the reactor a bed overflow product 72 was removed, a cyclone product 73 and gases with entrained dust at 74 passing through a wet scrubber at 75 producing a scrubber slurry 76.

FIG. 7 shows the flowsheet for two-stage chlorination. At 77, the material is pretreated as previously described herein, and then calcined at 78 at 625° C. to 1050° C. with the introduction of suitable amounts of air and fuel. The combustion gases, inert gases and water are removed. The calcined product is then sent to the Number One Chlorination Stage 79 at 700° C. to 1050° C. with the introduction of aluminum chloride as the major chlorinating agent and dilution gases selected from the group consisting of CO, $CO_2$, mixtures of CO and $CO_2$, $N_2$ and dehydrated air. The major resulting chloride gases comprising $AlCl_3$, $FeCl_3$, and $TiCl_4$ and dilution gases, are removed from this Number One Chlorination Stage and may be condensed to recover these components as described herein.

To produce the requisite fixed carbon or CO required in the system, the raw material would be subjected to reaction at 80 with a member selected from the group consisting of coal, bitumen, coke from coal or petroleum or charcoal. Since this raw material contains moisture as water and/or $H_2$, it is subjected to a temperature in the range of about 200° C. to 900° C. with the removal of moisture and $H_2$. The residual high fixed carbon product is then either fed directly and mixed with the residual solids, or alternatively the fixed carbon is converted to carbon monoxide and in both cases, is introduced with chlorine as a chlorinating agent either in the form of chlorine or phosgene at a temperature in the range of about 550° C. to 1050° C. The chlorination gases comprising $AlCl_3$, $SiCl_4$, $TiCl_4$, traces of $FeCl_3$, CO and $CO_2$, and dilution gases, if used, are removed and recovered as described as by condensation. The final product resulting from the Number Two Chlorination Stage is $SiO_2$, which may contain some residual $Al_2O_3$ and trace minerals.

FIG. 8 describes the three-stage chlorination process of this invention wherein the pretreatment and calcination of the aluminum-containing raw materials are as described in FIG. 7, as shown in pretreatment stage 82 and calcination, stage 83. In the Number One Chlorination Stage 84, $AlCl_3$ as the major chlorinating agent is introduced together with starvation quantities of chlorine or phosgene, and if chlorine is introduced, carbon and/or carbon monoxide are introduced as reducing agents. These latter materials are to replace the chlorine that has been removed from the system as iron chloride and titanium tetrachloride.

The gases evolving from the Number One Chlorination Stage may contain a trace of chlorine in combination with $SiCl_4$, $AlCl_3$, $FeCl_3$ and $FeCl_2$, $TiCl_4$, as well as dilution gases. The solids product from the Number One Chlorination Stage is then sent to the Number Two Chlorination Stage wherein the chlorination agent comprises the gases from the Number One Chlorination Stage containing $AlCl_3$, $SiCl_4$, a trace of chlorine, chlorides of iron, $TiCl_4$, and dilution gases. The resulting solids are then subjected to carbon monoxide or a high fixed carbon product from which the volatiles comprising $H_2O$ and $H_2$ have been removed at 86, to act as the reducing agent for the $Al_2O_3$ and its conversion to the final desired product, $AlCl_3$. The separation of the gaseous products and their handling have been previously described.

The resulting solids are then subjected to a Number Three Chlorination Stage at 87, in the presence of chlorine, catalysts, as required, and dilution gases, together with the CO and/or carbon from the carbonizing stage. From this reaction are recovered the volatile materials comprising $AlCl_3$, $SiCl_4$, $TiCl_4$, traces of Fe $Cl_3$, CO, $CO_2$ and dilution gases, if used. The $SiO_2$ product may contain residual $Al_2O_3$ and trace minerals.

EXAMPLES OF THE OPERATION OF THE INVENTION

In all of the following examples the ore as received was air dried for ease of handling and put through a hammer mill to produce a product that was approximately minus three quarter inch.

For pilot plant operation this was the feed material to the single stage wet ball mill grinding circuit that was used.

For laboratory research work the minus ¾ inch product was further reduced to minus 6 mesh for grinding in a single stage laboratory wet rod or ball mill.

EXAMPLE 1

This example is an illustration of employing a preferred embodiment of my invention in using at least one stage of high intensity magnetic separation.

The feed material was an Arkansas Bauxite.

The major components of the pilot plant was a ball mill, followed by a 35 mesh screen, a low intensity drum type magnetic separator, a Jones high intensity magnetic separator with reputed magnetic field strength of 14 to 16 kilogauss, and means for thickening, filtering and materials handling.

The feed rate to the ball mill circuit was 800 pounds per hour on a dry ore basis.

NaOH was used alone as the alkaline agent and throughout all of the tests the pH was maintained at the ball mill discharge between 10.7 and 10.9.

The Dispersing Agents were added to the feed end of the ball mill.

2080 is a lignin compound supplied by the Rayonier Company, a subsidiary of ITT.

HMP is sodium hexametaphosphate.

Orzan is a trade name of Crown Zellerbach, and is a lignin compound.

Quebracho is a lignin, and a bark extract from South America.

In all cases the percent solids in the ball mill discharge was controlled at approximately 50% solids, and the % solids to the number one high magnetic intensity stage of the Jones Magnetic Separator was 42 to 44%.

The screen oversize was sent to waste as it contained mainly wood.

The drum type magnetic cobber was of low kilogauss strength and not measured. It removed less than 0.2% of magnetic particles.

The Jones Magnetic Separator, supplied by Klockner Humboldt Deutz of Cologne, Germany, had an upper and lower magnetic ring.

In the following tests 2 magnetic cobbing stages were made on the top ring and one magnetic cobbing stage on the lower ring, for a total of three magnetic separation stages.

The following results were obtained with the major variable being the Dispersing Agents.

| Dispersing Agent lbs./Ton | % - Chemical Analysis and % Wt. | | | | | | | |
|---|---|---|---|---|---|---|---|---|
| | Magnetic Concts. | | | | Non Magnetics | | | |
| | $SiO_2$ | $Fe_2O_3$ | $TiO_2$ | % Wt. | $SiO_2$ | $Fe_2O_3$ | $TiO_2$ | % Wt. |
| 2080 3.97 lbs/Ton | 11.0 | 23.7 | 5.2 | 19.2 | 17.8 | 1.69 | 1.35 | 81.8 |
| HMP 1.0 lbs/Ton | 9.3 | 31.2 | 5.4 | 16.7 | 18.0 | 1.85 | 1.50 | 83.3 |
| HMP 1.0 lbs/Ton and Quebracho 0.75 lbs/Ton | 10.4 | 26.9 | 5.5 | 16.1 | 17.9 | 1.67 | 1.45 | 83.9 |
| Quebracho 1.06 lbs/Ton and Orzan 0.61 lbs/Ton | 9.6 | 27.9 | 5.4 | 15.6 | 18.0 | 1.81 | 1.46 | 84.4 |

Note:
Average head analysis was 16.0% $SiO_2$ 6.2% $Fe_2O_3$, and 2.0% $TiO_2$.

EXAMPLE 2

The following pilot plant run was made on an Arkansas Bauxitic Clay using the same circuitry as in Example 1. The major difference was in the % solids to the number one magnetic cobbing stage of the Jones Magnetic separator; this was 19.0% solids.

The Alkaline Agent was NaOH, and the pH in the circuit maintained at 10.7 to 10.8, and the Dispersing Agent was Quebracho used at the rate of 0.5 lbs/ton of ore.

The following results were obtained:

| % Chemical Analysis and % Wt. | | | | | | | |
|---|---|---|---|---|---|---|---|
| Magnetic Concts. | | | | Non Magnetics | | | |
| $SiO_2$ | $Fe_2O_3$ | $TiO_2$ | % Wt. | $SiO_2$ | $Fe_2O_3$ | $TiO_2$ | % Wt. |
| 21.8 | 21.9 | 7.2 | 11.7 | 32.9 | 0.88 | 1.14 | 88.3 |

Note: Head analysis of feed was 31.5% $SiO_2$, 3.34% $Fe_2O_3$ and 1.99% $TiO_2$.

EXAMPLE 3

This example is an illustration of employing a preferred embodiment of my invention in using at least one stage of high intensity magnetic separation and at least one stage of desliming.

The ore used was a Bauxite from South America which has been conventionally treated by crushing and washing out of the fines.

The head analysis was as follows:

| Chemical Analysis - % | | | |
|---|---|---|---|
| $SiO_2$ | $Fe_2O_3$ | $TiO_2$ | $P_2O_5$ |
| 4.0 | 8.1 | 1.0 | 0.12 |

600 grams of the dried material was ground in a laboratory rod mill at 50% solids with 12 ccs of 10% NaOH and 6 ccs of 2080 for 8.0 minutes. Following the ball mill the pulp was conditioned for 15 minutes in a Wemco cell with the pH adjusted to 12.0 with NaOH and then subjected to two stages of magnetic cobbing in a laboratory size Colburn high intensity magnetic unit.

The two magnetic concentrates were cleaned once with the cleaner tailings returned to the non-magnetic portion of the pulp.

The total non-magnetic portion was subjected to a desliming stage using a thickener-sizer as the equipment.

The following results were obtained:

| Product Produced | % Wt. | Chemical Analysis - % | | | |
|---|---|---|---|---|---|
| | | $SiO_2$ | $Fe_2O_3$ | $TiO_2$ | $P_2O_5$ |
| Magnetic Concentrate | 13.7 | 3.90 | 29.3 | 1.52 | |
| Deslime Product Minus 5 microns | 13.6 | 9.40 | 19.7 | 3.20 | |
| Deslime Product Plus 5 microns | 72.7 | 3.15 | 1.39 | 0.53 | 0.003 |
| | 100.0 | | | | |

As in Examples 1 and 2 the excellent metallurgical separation of the iron and titanium minerals with but minor losses in alumina are to be noted. In addition, these are low cost beneficiation steps.

EXAMPLE 4

This example is an illustration of employing a preferred embodiment of my invention in using at least one stage of high magnetic intensity separation prior to desliming, a desliming stage, and finally at least one stage of high magnetic intensity separation following desliming.

The ore used in this example was a Bauxite from Africa and had the following analysis:

| Chemical Analysis - % | | |
|---|---|---|
| $SiO_2$ | $Fe_2O_3$ | $TiO_2$ |
| 1.09 | 6.59 | 2.95 |

600 grams of the material was ground for 5 minutes in a laboratory ball mill at 50% solids and a pH of 10.3 using 8 ccs. of 10% NaOH and 18 ccs. of 2½% Quebracho solution. Following the grinding stage the pulp was transferred to a Wemco cell and conditioned for 5.0 minutes with the pulp pH adjusted to 10.5 with NaOH.

The pulp was then given a single stage high magnetic intensity pass through a Colburn laboratory unit and cleaned once with the cleaner tailings combined with the non-magnetic fraction produced. The total non-magnetics were then deslimed at approximately 5 microns using a laboratory thickener-sizer unit.

The plus 5 micron sized fraction was then diluted to approximately 20% solids and subjected to two passes through the Colburn unit at high magnetic intensity. The two magnetic concentrates were combined and cleaned once with the cleaner tailings combined with the non magnetic fraction.

The following results were obtained:

| Product Produced | % Wt. | Chemical Analysis - % | | |
|---|---|---|---|---|
| | | $SiO_2$ | $Fe_2O_3$ | $TiO_2$ |
| Magnetic Conct. 1 Prior to Desliming | 8.3 | 1.58 | 40.8 | 12.1 |
| Deslime Product Minus 5 microns | 19.8 | 1.42 | 8.8 | 3.5 |
| Magnetic Conct. 2 After Desliming | 5.2 | 0.96 | 11.0 | 4.6 |
| Deslime Product Plus 5 microns | 66.7 | 0.85 | 1.57 | 1.53 |

The Deslime Product Minus 5 microns and the Magnetic Conct. 2 after desliming are suitable feed materials to the Bayer Process, while the Deslime Product plug 5 microns is excellent feed material to my first chlorination stage.

The magnetic Conct. 1, prior to desliming, would be a waste product.

EXAMPLE 5

The following example shows the effect of granulation followed by pelletizing as described in FIG. 5.

The screen analyses of the dehydrated products was as follows:

| SIZE DISTRIBUTION (Percent finer than sieve opening) | | |
|---|---|---|
| Sieve Designation U.S. No. | 20.0% Moisture | 20.3% Moisture |
| 4 | 100.0 | 100.0 |
| 5 | 99.5 | 99.9 |
| 6 | 96.8 | 98.9 |
| 8 | 84.4 | 91.9 |
| 16 | 53.9 | 55.3 |
| 18 | 45.4 | 44.9 |
| 20 | 37.4 | 34.3 |
| 30 | 27.0 | 22.1 |
| 40 | 17.0 | 12.5 |
| 50 | 9.8 | 6.3 |
| 70 | 6.0 | 2.9 |
| 100 | 3.6 | 0.9 |

| BULK DENSITY (Loose) | |
|---|---|
| Calcined pellets | = 56.8 Lbs./Cu. Ft. |
| Dry pellets | = 54.5 Lbs./Cu. Ft. |
| 20% Moisture pellets | = 51.7 Lbs./Cu. Ft. |

EXAMPLE 6

This example is a preferred embodiment of my invention using in the beneficiation circuit three stages of high intensity magnetic cobbing in a Jones magnetic separator to produce three magnetic concentrates that were combined and hereafter referred to as "Total Magnetic Concentrate", and a non magnetic product. The non magnetic product was fed to a high efficiency cyclone to produce two products, the "Cyclone Underflow" which was substantially plus 500 Tyler Mesh, and the Cyclone Overflow which in turn was fed to a centrifuge for de-sliming at approximately 5.0 microns. Two products were produced from the centrifuge, and hereafter referred to as "Centrifuge Minus 5 Microns" and "Centrifuge Plus 5 Microns". The "Cyclone Underflow" was dried and dehydrated. The dehydrated product was then blended with $AlCl_3$ and fed continuously to a 4 inch fluo-solids reactor as shown at FIG. 5.

The ore used for this example was a Bauxite from South America and was particularly high in iron content.

The ore was treated as mined without the normal screening and washing procedures that eliminates, on a material of this type, about 40% or more as waste.

The beneficiation circuit used was a continuous operating pilot plant involving single ball mill in which the pulp density was 51% solids, the pH at the mill discharge maintained at 10.7 to 10.8 with NaOH, and 0.6 lbs. Quebracho per ton of feed, and 1.0 lbs. Orzan per dry ton feed were added to the ball mill intake.

Following the ball mill, the product was fed to a 28 mesh screen with the oversize, mainly wood, to waste, and the undersize diluted to 28% solids and fed to a Jones High Intensity Magnetic Separator, followed by 2 more passes through the separator. The three magnetic concentrates produced were combined into the "Total Magnetic Concentrate". The non magnetic product was fed to a high efficiency cyclone producing a Cyclone Underflow containing about 25% plus 500 mesh and a Cyclone Overflow that was approximately 85% minimum 500 mesh.

The Cyclone overflow was fed to a Bird Centrifuge producing an underflow product essentially plus 5 microns and an overflow product essentially minus 5 microns.

The "Cyclone Underflow" product was dried at approximately 120° C. to drive off the free moisture and then dehydrated at various temperatures as will be later detailed, and fed in a continuous manner in a number of tests to a 4 inch fluo-solids reactor with aluminum chloride and CO gas to partially simulate the Number One Chlorination Stage of the invention.

The following results were obtained from the Beneficiation Circuit.

| Product Produced | % Wt. | Chemical Analysis - % | | |
|---|---|---|---|---|
| | | $SiO_2$ | $Fe_2O_3$ | $TiO_2$ |
| Total Magnetic Concentrate | 18.2 | 6.1 | 48.6 | 1.76 |
| Centrifuge Minus 5 microns | 15.0 | 19.2 | 28.2 | 5.83 |
| Centrifuge Plus 5 microns | 27.3 | 3.35 | 6.7 | 1.70 |
| Cyclone Underflow | 39.5 | 2.7 | 2.8 | 0.92 |
| Calculated Heads | 100.0 | 6.1 | 16.0 | 2.0 |

The "Total Magnetic Concentrate" and the "Centrifuge Minus 5 Microns" would be treated as waste.

The "Centrifuge Plus 5 Microns" is excellent feed to the Bayer Process and appreciably higher in recoverable alumina content than conventionally crushed and washed Bauxite that is in planned production from the same geological area.

The "Cyclone Underflow" is an excellent alumina product and could be combined with the Centrifuge plus 5 micron product as feed to my number one chlorination stage. The following table shows the complete analysis of the combined products with the Al₂O₃ conventionally calculated.

| Chemical Analysis - % | | | | |
|---|---|---|---|---|
| Al₂O₃ | SiO₂ | Fe₂O₃ | TiO₂ | L.O.I. |
| 61.3 | 2.9 | 4.4 | 1.2 | 30.2 |

The Cyclone Underflow product, following dehydration, had the following chemical analysis:

| Chemical Analysis - % | | |
|---|---|---|
| SiO₂ | Fe₂O₃ | TiO₂ |
| 3.8 | 4.0 | 1.3 |

This material was the feed to the following tests partially simulating the number one chlorination stage of the invention.

Test 1
Flowsheet—As FIG. 5.
Dehydration Temperature and time—800° C. for 45 minutes.
Added gas—CO.
Feed—75% feed material and 25% solid AlCl₃.
Feed rate—45 grams per minute.
Calculated Residence time in Reactor—45 minutes.
Temperature in Reactor—800° C.
The test was run for a period of approximately 9 hours.

Dust losses to the wet scrubber were low, and the products from the Reactor bed overflow and the Cyclone underflow were split on approximately a 50/50 basis.

In this example, the calculated amount of AlCl₃ theoretically required is based on the following equations:

$$Fe_2O_3 + 2AlCl_3 \rightarrow Al_2O_3 + 2FeCl_3$$

$$3TiO_2 + 4AlCl_3 \rightarrow 3TiCl_4 + 2Al_2O_3$$

For this example, the clay contained 4.0% Fe₂O₃ and 1.2% TiO₂. Using the above equations, the theoretical amount of AlCl₃ required to totally convert the Fe₂O₃ and TiO₂ to FeCl₃ and TiCl₄, respectively, is 9.31% by weight of the total starting material. Thus, in this example, the excess AlCl₃ used over the stoichiometric amount was 168% by weight.

The following table shows the Fe₂O₃ and TiO₂ analysis of the best results obtained:

| | Chemical Analysis | |
|---|---|---|
| Product | Fe₂O₃ | TiO₂ |
| Bed Overflow | 0.33 | 0.21 |
| Cyclone Underflow | 0.80 | 0.53 |

These are outstanding results considering that the only chlorinating agent used was AlCl₃, the short chlorination period of 45 minutes, the short circuiting of fines to the cyclone, and without the use of a catalyst or HCl.

Test 2
This test run was a near duplication of Test 1 with the major exception being the dehydration which was carried out at 770° C. for 30 minutes.

The test run was for a period of approximately 8.0 hours.

The following table shows the Fe₂O₃ and TiO₂ analysis of the best results obtained:

| | Chemical Analysis - % | |
|---|---|---|
| Product | Fe₂O₃ | TiO₂ |
| Bed Overflow | 0.46 | 0.18 |
| Cyclone Underflow | 0.35 | 0.49 |

EXAMPLE 7

This example illustrates the number one chlorination stage of my invention wherein the iron can be brought down to a low level.

The residual titanium minerals would be chlorinated in the number two chlorination stage and differentially condensed from the AlCl₃ and SiCl₄.

The material used in this example was an aluminum mineral flotation concentrate produced from a high silica Arkansas Bauxite and in accordance with my issued U.S. Pat. No. 4,113,466 and my pending U.S. application Ser. No. 838,445 in which I used prior to flotation two stages of high magnetic intensity cobbing to remove a magnetic concentrate containing a large percentage of the irona dnt titanium minerals.

The head samples of this concentrate as produced and after dehydration were as follows:

| | Chemical Analysis - % | | |
|---|---|---|---|
| Product | SiO₂ | Fe₂O₃ | TiO₂ |
| Flotation Conct. Dried at 120° C. | 4.2 | 1.82 | 1.96 |
| Flotation Conct. Dehydrated at 800° C. | 6.0 | 2.6 | 2.8 |

The only differences in this test and tests 1 and 2 of Example 5 where as follows:
Dehydration Temperature of feed material, 800° C. for 30 minutes.
Pre-heating of CO gas—1500° F.
Reactor inlet temperature—600° F.
Time of Test—2½ hours, where maximum removal of iron and titanium minerals had not been reached.
Feed rate—30 grams per minute.
Residence Time in Reactor—45 minutes.
Feed Mixture—70% Feed material to 30% AlCl₃.
The following results were obtained:

| | Chemical Analysis - % | |
|---|---|---|
| Product | Fe₂O₃ | TiO₂ |
| Bed Overflow | 0.31 | 0.73 |
| Cyclone Underflow | 0.27 | 1.42 |

In this example, the calculated amount of AlCl₃ theoretically required is based on the following equations:

$$Fe_2O_3 + 2AlCl_3 \rightarrow Al_2O_3 + 2FeCl_3$$

$$3TiO_2 + 4AlCl_3 \rightarrow 3TiCl_4 + 2Al_2O_3$$

For this example, the clay contained 2.6% Fe₂O₃ and 2.8% TiO₂. Using the above equations, the theoretical amount of AlCl₃ required to totally convert the Fe₂O₃ and TiO₂ to FeCl₃ and TiCl₄, respectively, is 10.55% by weight of the total starting material. Thus, in this example, the excess AlCl$_3$ used over the stoichiometric amount was 184% by weight.

For purposes of this patent application, when I refer to a major excess of AlCl$_3$ used in my process, I mean at least 25%, but preferably at least 50% by weight of AlCl$_3$ over the stoichiometric requirements according to the above equations.

The invention has been described herein with references to certain preferred embodiments. However, as obvious variations thereon will become apparent to those skilled in the art, the invention is not considered to be limimted thereto.

What I claim is:

1. A process for the production of an essentially iron-free alumina product from aluminum mineral bearing materials containing at least iron minerals comprising:
    (a) selecting an aluminum bearing material containing a maximum iron content calculated as Fe$_2$O$_3$ of 8.0% following dehydration as the feed to the chlorination stage;
    (b) dehydrating the said aluminum bearing material by heating in the temperature range of about 625° C. to about 1050° C.;
    (c) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron materials to their respective chlorides, said aluminum chloride including recycle impure AlCl$_3$ from the gaseous effluent of said chlorination reaction;
    (d) recovering a solids product comprising an essentially iron-free alumina product, and a gaseous effluent;
    (e) subjecting the gaseous effluent from the said chlorination stage to condensation and/or fractional distillation to recover chlorides of iron and other metals, and residual aluminum chloride containing residual amounts of other products of condensation; and
    (f) recycling to the chlorination stage the said residual aluminum chloride as at least a portion of the said aluminum chloride chlorinating agent.

2. A process for the production of an essentially iron-free alumina product from aluminum mineral bearing materials containing at least iron minerals comprising:
    (a) selecting an aluminum bearing material containing a maximum iron content calculated as Fe$_2$O$_3$ of 8.0% following dehydration as the feed to the chlorination stage;
    (b) dehydrating the said aluminum bearing material by heating in the temperature range of about 625° C. to about 1050° C.;
    (c) subjecting the said dehydrated material to chlorination to differentially chlorinate at least the said contained iron materials by reaction with a chlorination agent at a temperature in the range of 550° C. to 1050° C. and in which the chlorination agent comprises at least a 25% stoichiometric excess of aluminum chloride over the amount necessary to convert the iron minerals to their respective chlorides, said aluminum chloride including recycle impure AlCl$_3$ from the gaseous effluent of said chlorination reaction; and said chlorination agent further comprising a member selected from the group consisting of phosgene and chlorine, and when chlorine is used, in combination with carbon, carbon monoxide, or mixtures thereof;
    (d) recovering a solids product comprising an essentially iron-free alumina product, and a gaseous effluent;
    (e) subjecting the gaseous effluent from the said chlorination stage to condensation and/or fractional distillation to recover chlorides of iron and other metals, and residual aluminum chloride containing residual amounts of other products of condensation; and
    (f) recycling to the chlorination stage the said residual aluminum chloride as at least a portion of the said aluminum chloride chlorinating agent.

3. A process for the production of an essentially iron-free alumina product from aluminum mineral bearing materials containing at least iron minerals comprising:
    (a) selecting an aluminum bearing material containing a maximum iron content calculated as Fe$_2$O$_3$ of 8.0% following dehydration as the feed to the chlorination stage;
    (b) subjecting the aluminum mineral bearing material to pelletization, granulation, or both, to obtain a solid form product;
    (c) dehydrating the said aluminum bearing material by heating in the temperature range of about 625° C. to about 1050° C.;
    (d) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron minerals to their respective chlorides, said aluminum chloride including recycle impure AlCl$_3$ from the gaseous effluent of said chlorination reaction;
    (e) recovering a solids product comprising an essentially iron-free alumina product, and a gaseous effluent;
    (f) subjecting the gaseous effluent from the said chlorination stage to condensation and/or fractional distillation to recover chlorides of iron and other metals, and residual aluminum chloride containing residual amounts of other products of condensation; and
    (g) recycling to the chlorination stage the said residual aluminum chloride as at least a portion of the said aluminum chloride chlorinating agent.

4. A process for the production of an essentially iron-free alumina product from aluminum mineral bearing materials containing at least iron minerals comprising:
    (a) selecting an aluminum bearing material containing a maximum iron content calculated as Fe$_2$O$_3$ of 8.0% following dehydration as the feed to the chlorination stage;
    (b) subjecting said aluminum mineral bearing material to at least one stage of high intensity magnetic separation using a magnetic field strength of at least 11.0 kilogauss, and removing therefrom a magnetic concentrate comprising chiefly iron and titanium minerals to provide a nonmagnetic portion of the aluminum bearing material for dehydration;

(c) subjecting the non-magnetic portion of said aluminum mineral bearing material to pelletization, granulation, or both, to obtain a solid form product;

(d) dehydrating the said aluminum bearing material by heating in the temperature range of about 625° C. to about 1050° C.;

(e) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron minerals to their respective chlorides, said aluminum chloride including recycle impure $AlCl_3$ from the gaseous effluent of said chlorination reaction;

(f) recovering a solids product comprising an essentially iron-free alumina product, and a gaseous effluent;

(g) subjecting the gaseous effluent from the said chlorination stage to condensation and/or fractional distillation to recover chlorides of iron and other metals, and residual aluminum chloride containing residual amounts of other products of condensating; and (h) recycling to the chlorination stage the said residual aluminum chloride as at least a portion of the said aluminum chloride chlorinating agent.

5. The process of claims 1, 2, 3, or 4 wherein the said aluminum mineral bearing material is selected from the group consisting of bauxite, bauxitic clays and clays.

6. The process of claims 1, 2, 3, or 4 in which the said gaseous effluent from the chlorinating stage is subjected to condensation and distillation to produce iron chlorides, impure aluminum chloride, and titanium tetrachloride.

7. The process of claims 1, 2, 3, or 4 wherein the chlorination agent comprises a mixture of aluminum chloride and $FeCl_3$, a mixture of aluminum chloride and silicon tetrachloride, aluminum chloride and a catalyst selected from the group consisting of sodium chloride, potassium chloride, sodium aluminum chloride and potassium aluminum chloride, or a mixture of at least aluminum chloride and hydrogen chloride.

8. The process of claims 1, 2, 3, or 4 wherein the gaseous effluent from the chlorination stage is stage condensed to produce iron chlorides and impure aluminum chloride and titanium tetrachloride with the uncondensed gaseous product consisting essentially of carbon monoxide and carbon dioxide, and wherein uncondensed gaseous carbon monoxide and carbon dioxide are recycled to the said dehydration stage.

9. The process according to claims 1, 2, 3, or 4 wherein the effluent gases resulting from the chlorination stage comprise at least $FeCl_3$, $TiCl_4$, $SiCl_4$ and $AlCl_3$, the ferric chloride is removed, the $SiCl_4$ and residual $AlCl_3$ are recovered and cycled to the chlorination stage.

10. The process of claims 1 or 2 wherein the aluminum mineral bearing materials are subjected to pelletization prior to dehydration, are subjected to granulation prior to dehydration, or are granulated and then pelletized prior to dehydration.

11. A process for the production of an essentially iron-free alumina product from aluminum mineral bearing materials containing at least iron minerals in which said process entails the use of at least two stages of chlorination comprising:

(a) selecting an aluminum bearing material containing a maximum iron content calculated as $Fe_2O_3$ of 8.0% following dehydration as the feed to the first calculation stage of the said at least two stages of chlorination;

(b) dehydrating the said aluminum bearing material in the temperature range of about 625° C. to about 1050° C.;

(c) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron minerals to their respective chlorides, said aluminum chloride including recycle impure $AlCl_3$ from the gaseous effluent of said chlorination reaction;

(d) recovering a solids product comprising an essentially iron-free alumina product, and a gaseous effluent;

(e) subjecting the gaseous effluent from the said chlorination stage to condensation and/or fractional distillation to recover chlorides of iron and other metals, and residual aluminum chloride containing residual amounts of other products of condensation; and (f) recycling to the chlorination stage the said residual aluminum chloride as at least a portion of the said aluminum chloride chlorinating agent;

(g) subjecting the residual solids from said first chlorination stage to a second chlorination stage by reaction with a chlorination agent comprising starvation amounts of chlorine or phosgene or mixtures thereof and, when chlorine is used, in the presence of a reducing agent selected from the group consisting of carbon, carbon monoxide and mixtures thereof, at a temperature in the range of 625° C.–1050° C.;

(h) cycling at least a major portion of the gases produced by said second chlorination stage to said first chlorination stage as a chlorinating agent; and (i) recovering the residual solids from said second chlorination stage, said solids comprising essentially an iron-free alumina product.

12. A process for the production of an essentially iron- and silicon-free aluminum chloride product from aluminum mineral bearing materials containing at least iron minerals and silicate minerals in which said process entails the use of at least two stages of chlorination comprising:

(a) selecting an aluminum bearing material containing a maximum iron content calculated as $Fe_2O_3$ of 8.0% following dehydration as the feed to the first chlorination stage of the said at least two stages of chlorination;

(b) dehydrating the said aluminum bearing material by heating in the temperature range of about 625° C. to about 1050° C.;

(c) subjecting the said dehydrated material to chlorination to differentially chlorinate at least the said contained iron minerals by reaction with at least one chlorination agent at a temperature in the range of 550° C. to 1050° C. and in which the chlorination agent comprises at least a 25% stoichiometric excess of aluminum chloride over the amount necessary to convert the iron minerals to their respective chlorides, said aluminum chloride including recycling impure AlCl₃ from the gaseous effluent of said chlorination reaction;

(d) recovering a solids product comprising an essentially iron-free alumina product, and a gaseous effluent;

(e) subjecting the gaseous effluent from the said chlorination stage to condensation and/or fractional distillation to recover chlorides of iron and chlorides of other metals, and residual aluminum chloride containing residual amounts of other products of condensation;

(f) recycling to the chlorination stage the said residual aluminum chloride as at least a portion of the said aluminum chloride chlorinating agent;

(g) subjecting the solids from said first chlorination stage to a second chlorination stage by reaction with a chlorination agent to convert at least all of the contained $Al_2O_3$ to $AlCl_3$, said chlorination agent comprising chlorine or phosgene, and when chlorine is used, in the presence of a reducing agent selected from the group consisting of carbon, carbon monoxide, and mixtures thereof, and at a temperature in the range of 625° C.–1050° C.;

(h) recovering the residual solids from said second chlorination stage, which said solids comprise essentially $SiO_2$ with minor amounts of $Al_2O_3$ product;

(i) removing the gaseous products of chlorination comprising major amounts of aluminum chloride and minor amounts of silicon tetrachloride; and (j) subjecting said gaseous products to at least controlled temperature condensation and/or in combination with fractional distillation to produce essentially iron- and silicon-free aluminum chloride.

13. A process for the production of an essentially iron-free alumina product from aluminum mineral bearing materials containing at least iron minerals in which said process entails the use of at least two stages of chlorination comprising:

(a) selecting an aluminum bearing material containing a maximum iron contact calculated as $Fe_2O_3$ of 8.0% following dehydration as the feed to the first chlorination stage of the said at least two stages of chlorination;

(b) dehydrating the said aluminum bearing material in the temperature range of about 625° C. to about 1050° C.;

(c) subjecting the said dehydrated material to chlorination to differentially chlorinate at least the said contained iron minerals by reaction with at least one chlorination agent at a temperature in the range of 550° C. to 1050° C.; and in which the chlorination agent comprises at least a 25% stoichiometric excess of aluminum chloride over the amount necessary to convert the iron minerals to their respective chlorides, said aluminum chloride including recycle impure AlCl₃ from the gaseous effluent of said chlorination reaction;

(d) recovering a solids product comprising an essentially iron-free alumina product, and a gaseous effluent;

(e) subjecting the iron-free alumina solids to a carbonizing stage in the presence of a carbon-containing material at a temperature range of 200° C. to 900° C. to remove the volatiles contained in the carbon-containing material;

(f) subjecting the gaseous effluent from the said chlorination stage to condensation and/or fractional distillation to recover chlorides of iron and other metals, and residual aluminum chloride containing residual amounts of other products of condensation;

(g) recycling to the chlorination stage the said residual aluminum chloride as at least a portion of the said aluminum chloride chlorinating agent;

(h) subjecting the mixture of residual solids and carbon-containing material from said carbonizing stage to a second chlorination stage by reaction with a chlorination agent comprising starvation amounts of chlorine or phosgene or mixtures thereof and, when chlorine is used, in the presence of a reducing agent selected from the group consisting of carbon, carbon monoxide and mixtures thereof, at a temperature in the range of 625° C.–1050° C.;

(i) cycling at least a major portion of the gases produced by said second chlorination stage to said first chlorination stage as a chlorinating agent; and (j) recovering the residual solids from said second chlorination stage, said solids comprising essentially an iron-free alumina product.

14. A process for the production of an essentially iron-free alumina product from aluminum mineral bearing materials containing at least iron minerals in which said process entails the use of at least two stages of chlorination comprising:

(a) selecting an aluminum bearing material containing a maximum iron content calculated as $Fe_2O_3$ of 8.0% following dehydration as the feed to the first chlorination stage of the said at least two stages of chlorination:

(b) subjecting the aluminum mineral bearing materials to pelletization, granulation, or both, prior to dehydration;

(c) dehydrating the said aluminum bearing material in the temperature range of about 625° C. to about 1050° C.;

(d) subjecting the said dehydrated material to chlorination to differentially chlorinate at least the said contained iron minerals by reaction with at least one chlorination agent at a temperature in the range of 550° C. to 1050° C. and in which the chlorination agent comprises at least a 25% stoichiometric excess of aluminum chloride over the amount necessary to convert the iron minerals to their respective chlorides, said aluminum chloride including recycle impure AlCl₃ from the gaseous effluent of said chlorination reaction;

(e) recovering a solids product comprising an essentially iron-free alumina product, and a gaseous effluent;

(f) subjecting the gaseous effluent from the said chlorination stage to condensation and/or fractional distillation to recover chlorides of iron and other metals, and residual aluminum chloride containing residual amounts of other products of condensation;

(g) recycling to the chlorination stage the said residual aluminum chloride as at least a portion of the said aluminum chloride chlorinating agent;

(h) subjecting the residual solids from said first chlorination stage to a second chlorination stage by reaction with a chlorination agent comprising starvation amounts of chlorine or phosgene or mixtures thereof and, when chlorine is used, in the presence of a reducing agent selected from the group consisting of carbon, carbon monoxide and mixtures thereof, at a temperature in the range of 625° C.–1050° C.;

(i) cycling at least a major portion of the gases produced by said second chlorination stage to said first chlorination stage as a chlorinating agent; and (j) recovering the residual solids from said second chlorination stage, said solids comprising essentially an iron-free alumina product.

15. A process for the production of an essentially iron-free alumina product from aluminum mineral bearing materials containing at least iron minerals in which said process entails the use of at least two stages of chlorination comprising:

(a) selecting an aluminum bearing material containing a maximum iron content calculated as $Fe_2O_3$ of 8.0% following dehydration as the feed to the first chlorination stage of the said at least two stages of chlorination;

(b) subjecting the aluminum mineral bearing material to at least one stage of high intensity magnetic separation using a magnetic field strength of at least 11.0 kilogauss, and removing therefrom a magnetic concentrate comprising chiefly iron and titanium minerals to provide a nonmagnetic portion of the aluminum bearing material for dehydration;

(c) subjecting the non-magnetic portion of said aluminum mineral bearing material to pelletization, granulation, or both, to obtain a solid form product;

(d) dehydrating the said aluminum bearing material in the temperature range of about 625° C. to about 1050° C.;

(e) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron minerals to their respective chlorides, said aluminum chloride including recycle impure $AlCl_3$ from the gaseous effluent of said chlorination reaction;

(f) recovering a solids product comprising an essentially iron-free alumina product, and a gaseous effluent;

(g) subjecting the gaseous effluent from the said chlorination stage to condensation and/or fractional distillation to recover chlorides of iron and other metals, and residual aluminum chloride containing residual amounts of other products of condensation;

(h) recycling to the chlorination stage the said residual aluminum chloride as at least a portion of the said aluminum chloride chlorinating agent;

(i) subjecting the residual solids from said first chlorination stage to a second chlorination stage by reaction with a chlorination agent comprising starvation amounts of chlorine or phosgene or mixtures thereof and, when chlorine is used, in the presence of a reducing agent selected from the group consisting of carbon, carbon monoxide and mixtures thereof, at a temperature in the range of 625° C.–1050° C.;

(j) cycling at least a major portion of the gases produced by said second chlorination stage to said first chlorination stage as a chlorinating agent; and (k) recovering the residual solids from said second chlorination stage, said solids comprising essentially an iron-free alumina product.

16. A process for the production of an essentially iron- and silicon-free aluminum chloride product from aluminum mineral bearing materials containing at least iron minerals and silicate materials in which said process entails the use of at least two stages of chlorination comprising:

(a) subjecting an aluminum bearing material containing a maximum iron content calculated as $Fe_2O_3$ of 8.0% following dehydration as the feed to the first chlorination stage of the said at least two stages of chlorination;

(b) subjecting the aluminum mineral bearing material to pelletization, granulation, or both, to obtain a solid form product;

(c) dehydrating the said aluminum bearing material by heating in the temperature range of about 625° C. to about 1050° C.;

(d) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron minerals to their respective chlorides, said aluminum chloride including recycle impure $AlCl_3$ from the gaseous effluent of said chlorination reaction;

(e) recovering a solids product comprising an essentially iron-free alumina product, and a gaseous effluent;

(f) subjecting the gaseous effluent from the said chlorination stage to condensation and/or fractional distillation to recover chlorides of iron and other metals, and residual aluminum chloride containing residual amounts of other products of condensation;

(g) recycling to the chlorination stage the said residual aluminum chloride as at least a portion of the said aluminum chloride chlorinating agent;

(h) subjecting the solids from said first chlorination stage to a second chlorination stage by reaction with a chlorination agent comprising chlorine or phosgene or mixtures thereof, and, when chlorine is used, in the presence of a reducing agent selected from the group consisting of carbon, carbon monoxide, and mixtures thereof, and at a temperature in the range of 625° C.–1050° C.; using sufficient chlorination agent to convert at least all of the contained $Al_2O_3$ to $AlCl_3$;

(i) recovering the residual solids from the said second chlorination stage, which said solids comprise essentially $SiO_2$ with minor amounts of $Al_2O_3$ product;

(j) removing the gaseous products of chlorination comprising major amounts of aluminum chloride and minor amounts of silicon tetrachloride; and (k) subjecting said gaseous products to at least controlled temperature condensation and/or in combination with fractional distillation to produce essentially iron- and silicon-free aluminum chloride.

17. A process for the production of an essentially iron- and silicon-free aluminum chloride product from aluminum mineral bearing materials containing at least iron minerals and silicate minerals in which said process entails the use of at least two stages of chlorination comprising:

(a) selecting an aluminum bearing material containing a maximum iron content calculated as Fe$_2$O$_3$ of 8.0% following dehydration as the feed to the first chlorination stage of the said at least two stages of chlorination;

(b) subjecting said aluminum bearing material to at least one stage of high intensity magnetic separation using a magnetic field strength of at least 11.0 kilogauss, and removing therefrom a magnetic concentrate comprising chiefly iron and titanium minerals to provide a nonmagnetic portion of the aluminum bearing material for dehydration;

(c) subjecting the non-magnetic portion of said aluminum mineral bearing material to pelletization, granulation, or both, to obtain a solid form product;

(d) dehydrating the said aluminum bearing material by heating in the temperature range of about 625° C. to about 1050° C.;

(e) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron minerals to their respective chlorides, said aluminum chloride including recycle impure AlCl$_3$ from the gaseous effluent of said chlorination reaction;

(f) recovering a solids product comprising an essentially iron-free alumina product, and a gaseous effluent;

(g) subjecting the gaseous effluent from the said chlorination stage to condensation and/or fractional distillation to recover chlorides of iron and other metals, and residual aluminum chloride containing residual amounts of other products of condensation;

(h) recycling to the chlorination stage the said residual aluminum chloride as at least a portion of the said aluminum chloride chlorinating agent;

(i) subjecting the solids from said first chlorination stage to a second chlorination stage by reaction with a chlorination agent comprising chlorine or phosgene or mixtures thereof, and, when chlorine is used, in the presence of a reducing agent selected from the group consisting of carbon, carbon monoxide, and mixtures thereof, and at a temperature in the range of 625° C.–1050° C.; using sufficient chlorination agent to covert at least all of the contained Al$_2$O$_3$ to AlCl$_3$;

(j) recovering the residual solids from said second chlorination stage, which said solids comprise essentially SiO$_2$ with minor amounts of Al$_2$O$_3$ product;

(k) removing the gaseous products of chlorination comprising major amounts of aluminum chloride and minor amounts of silicon tetrachloride; and (l) subjecting said gaseous products to at least controlled temperature condensation and/or in combination with fractional distillation to produce essentially iron- and silicon-free aluminum chloride and silicon tetrachloride.

18. The process of claims 11, 12, 13, 14, 15, 16, or 17 wherein the said aluminum mineral bearing material is selected from the group consisting of bauxite, bauxitic clays and clays.

19. The process of claims 11, 12, 13, 14, 15, 16, or 17 in which the said gaseous effluent from the first chlorinating stage is subjected to condensation and distillation to produce iron chloride, impure aluminum chloride, and titanium tetrachloride.

20. The process of claims 11, 12, 13, 14, 15, 16, or 17 wherein the first stage chlorination agent comprises a mixture of aluminum chloride and FeCl$_3$, a mixture of aluminum chloride and silicon tetrachloride, aluminum chloride and a catalyst selected from the group consisting of sodium chloride, potassium chloride, sodium aluminum chloride and potassium aluminum chloride, or a mixture of at least aluminum chloride and hydrogen chloride.

21. The process of claims 11, 12, 13, 14, 15, 16, or 17 wherein the gaseous effluent from the first chlorination stage is stage condensed to produce iron chlorides and impure aluminum chloride and titanium tetrachloride with the uncondensed gaseous product consisting essentially of carbon monoxide and carbon dioxide, and wherein uncondensed gaseous carbon monoxide and carbon dioxide are recycled to the said dehydration stage.

22. The process according to claims 11, 12, 13, 14, 15, 16, or 17 wherein the effluent gases resulting from the first chlorination stage comprise at least FeCl$_3$, TiCl$_4$, SiCl$_4$ and AlCl$_3$, the ferric chloride is removed, the SiCl$_4$ and residual AlCl$_3$ are recovered and cycled to the first chlorination stage.

23. The process of claims 11, 12, or 13 wherein the aluminum mineral bearing materials are subjected to pelletization prior to dehydration, are subjected to granulation prior to dehydration, or are granulated and then pelletized prior to dehydration.

24. A process for the production of an essentially iron-, silicon- and titanium-free aluminum chloride product from aluminum mineral bearing materials containing at least iron and titanium minerals and silicate minerals in which said process entails the use of at least three stages of chlorination comprising:

(a) selection of said aluminum bearing material containing a maximum iron content calculated as Fe$_2$O$_3$ of 8.0% following dehydration as the feed to the first chlorination stage of the said at least three stages of chlorination;

(b) dehydrating the said aluminum bearing material by heating in the temperature range of about 625° C. to about 1050° C.;

(c) subjecting the said dehydrated material to chlorination to differentially chlorinate at least the said contained iron minerals by reaction with at least one chlorination agent at a temperature in the range of 550° C.–1050° C. and in which the chlorination agent comprises at least a 25% stoichiometric excess of aluminum chloride over the amount necessary to convert the iron minerals to their respective chlorides, said aluminum chloride including recycle impure AlCl$_3$ from the gaseous effluent of said chlorination reaction;

(d) subjecting the residual solids from said first chlorination stage to a second chlorination stage and contacting with starvation amounts of a chlorination agent selected from the group consisting of chlorine, phosgene or mixtures thereof, and, when chlorine is used, in the presence of a reducing agent selected from the group consisting of carbon, carbon monoxide, and mixtures thereof, at a temperature in the range of 625° C.-1050° C. to produce at least the said chlorination agent aluminum chloride;

(e) recycling at least a major portion of the gases produced by said second chlorination stage to said first chlorination stage;

(f) recovering the residual solids from said second chlorination stage, which said solids are essentially an iron- and titanium-free alumina product;

(g) subjecting said essentially iron- and titanium-free alumina product to a third chlorination stage at a temperature in the range of 550° C.-1050° C. by contacting with a chlorination agent selected from the group consisting of chlorine, phosgene and mixtures thereof as the chlorination agent and when chlorine is used, in the presence of a reducing agent selected from the group consisting of carbon, carbon monoxide, and mixtures thereof, to effect said chlorination;

(h) removing the solids comprising $SiO_2$ and minor amounts of $Al_2O_3$;

(i) removing the gaseous products of chlorination comprising major amounts of aluminum chloride and minor amounts of silicon tetrachloride; and (j) subjecting said gaseous products to at least controlled temperature condensation and/or in combination with distillation to produce essentially iron, titanium and silicon-free aluminum chloride.

25. A process for the production of an essentially iron-, silicon- and titanium-free aluminum chloride product from aluminum mineral bearing materials containing at least iron and titanium minerals and silicate minerals in which said process entails the use of at least three stages of chlorination comprising:

(a) selection of said aluminum bearing material containing a maximum iron content calculated as $Fe_2O_3$ of 8.0% following dehydration and as the feed to the first chlorination stage of the said at least three stages of chlorination;

(b) subjecting the aluminum mineral bearing material to pelletization, granulation, or both, to obtain a solid form product;

(c) dehydrating the said aluminum bearing material by heating in the temperature range of about 625° C. to about 1050° C.;

(d) subjecting the said dehydrated material to chlorination to differentially chlorinate at least the said contained iron minerals by reaction with at least one chlorination agent at a temperature in the range of 550° C.-1050° C. and in which the chlorination agent comprises at least a 25% stoichiometric excess of aluminum chloride over the amount necessary to convert the iron minerals to their respective chlorides, said aluminum chloride including recycle impure $AlCl_3$ from the gaseous effluent of said chlorination reaction;

(e) subjecting the residual solids from said first chlorination stage to a second chlorination stage and contacting with starvation amounts of a chlorination agent selected from the group consisting of chlorine, phosgene or mixtures thereof, and, when chlorine is used, in the presence of a reducing agent selected from the group consisting of carbon, carbon monoxide, and mixtures thereof, at a temperature in the range of 625° C.-1050° C. to produce at least the said chlorination agent aluminum chloride;

(f) recycling at least a major portion of the gases produced by said second chlorination stage to said first chlorination stage;

(g) recovering the residual solids from said second chlorination stage, which said solids are essentially an iron- and titanium-free alumina product;

(h) subjecting said essentially iron- and titanium-free alumina product to a third chlorination stage by contact at a temperature in the range of 550° C.-1050° C. and contacting with a chlorination agent selected from the group consisting of chlorine, phosgene and mixtures thereof as the chlorination agent and when chlorine is used, in the presence of a reducing agent selected from the group consisting of carbon, carbon monoxide, and mixtures thereof, to effect said chlorination;

(i) removing the solids comprising $SiO_2$ and minor amounts of $Al_2O_3$;

(j) removing the gaseous products of chlorination comprising major amounts of aluminum chloride and minor amounts of silicon tetrachloride; and (k) subjecting said gaseous products to at least controlled temperature condensation and/or in combination with distillation to produce essentially iron, titanium and silicon-free aluminum chloride.

26. A process for the production of an essentially iron-, silicon- and titanium-free aluminum chloride product from aluminum mineral bearing materials containing at least iron and titanium minerals and silicate minerals in which said process entails the use of at least three stages of chlorination comprising:

(a) selection of said aluminum bearing material containing a maximum iron content calculated as $Fe_2O_3$ of 8.0% following dehydration and as the feed to the first chlorination stage of the said at least three stages of chlorination;

(b) subjecting the said aluminum mineral bearing material to at least one stage of high intensity magnetic separation using a magnetic field strength of at least 11.0 kilogauss, and removing therefrom a magnetic concentrate comprising chiefly iron and titanium minerals to provide a nonmagnetic portion of the aluminum bearing material for dehydration;

(c) subjecting the non-magnetic portion of said aluminum mineral bearing material to pelletization, granulation, or both, to obtain a solid form product;

(d) dehydrating the said aluminum bearing material by heating in the temperature range of about 625° C. to about 1050° C.;

(e) subjecting the said dehydrated material to chlorination to differentially chlorinate at least the said contained iron minerals by reaction with at least one chlorination agent at a temperature in the range of 550° C.-1050° C. and in which the chlorination agent comprises at least a 25% stoichiometric excess of aluminum chloride over the amount necessary to convert the iron minerals to their respective chlorides, said aluminum chloride including recycle impure $AlCl_3$ from the gaseous effluent of said chlorination reaction;

(f) subjecting the residual solids from said firt chlorination stage to a second chlorination stage and contacting with starvation amounts of a chlorination agent selected from the group consisting of chlorine, phosgene or mixtures thereof, and, when chlorine is used, in the presence of a reducing agent selected from the group consisting of carbon, carbon monoxide, and mixtures thereof, at a temperature in the range of 625° C.–1050° C. to produce at least the said chlorination agent aluminum chloride;

(g) recycling at least a major portion of the gases produced by said second chlorination stage to said first chlorination stage;

(h) recovering the residual solids from said second chlorination stage, which said solids are essentially an iron- and titanium-free alumina product;

(i) subjecting said essentially iron- and titanium-free alumina product to a third chlorination stage at a temperature in the range of 550° C.–1050° C. by contacting with a chlorination agent selected from the group consisting of chlorine, phosgene and mixtures thereof as the chlorination agent and when chlorine is used, in the presence of a reducing agent selected from the group consisting of carbon, carbon monoxide, and mixtures thereof, to effect said chlorination;

(j) removing the solids comprising $SiO_2$ and minor amounts of $Al_2O_3$;

(k) removing the gaseous products of chlorination comprising major amounts of aluminum chloride and minor amounts of silicon tetrachloride; and (l) subjecting said gaseous products to at least controlled temperature condensation and/or in combination with distillation to produce essentially iron, titanium and silicon-free aluminum chloride.

27. A process according to claims 24, 25, or 26 wherein at least a portion of said silicon tetrachloride produced in the third stage chlorination is recycled to one or more of the three chlorination stages.

* * * * *